(12) United States Patent
Augustine et al.

(10) Patent No.: US 7,721,616 B2
(45) Date of Patent: May 25, 2010

(54) SPRUNG GEAR SET AND METHOD

(75) Inventors: Michael J. Augustine, Mayville, MI (US); Christian E. Ross, Hemlock, MI (US); Steven J. Collier-Hallman, Frankenmuth, MI (US); Mohammad S. Islam, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 615 days.

(21) Appl. No.: 11/556,775

(22) Filed: Nov. 6, 2006

(65) Prior Publication Data

US 2007/0125193 A1    Jun. 7, 2007

Related U.S. Application Data

(60) Provisional application No. 60/742,449, filed on Dec. 5, 2005.

(51) Int. Cl.
*F16H 3/34* (2006.01)
*F16H 57/12* (2006.01)
*F16H 55/18* (2006.01)
*F16H 1/16* (2006.01)

(52) U.S. Cl. ............................. 74/352; 74/392; 74/409; 74/425

(58) Field of Classification Search .................. 74/339, 74/352, 353, 354, 425, 409, 392, 395, 396, 74/397, 398, 399, 400, 401, 402, 403; 180/444
See application file for complete search history.

(56) References Cited

U.S. PATENT DOCUMENTS

| | | | |
|---|---|---|---|
| 3,220,277 A | | 11/1965 | Dixon |
| 3,339,426 A | * | 9/1967 | Karl-Heinz ................. 74/425 |
| 3,463,030 A | | 8/1969 | Nuccel |
| 3,641,832 A | | 2/1972 | Shigeta et al. |
| 3,848,477 A | | 11/1974 | Giandinoto et al. |
| 3,851,538 A | | 12/1974 | Denkowski et al. |
| 4,040,307 A | * | 8/1977 | Koster ........................ 74/425 |
| 4,227,104 A | | 10/1980 | Hamman |
| 4,261,218 A | | 4/1981 | Eagan, Sr. |
| 4,586,393 A | | 5/1986 | Mooney et al. |
| 4,621,933 A | * | 11/1986 | Musso ........................ 400/555 |
| 4,665,765 A | | 5/1987 | Heine |

(Continued)

FOREIGN PATENT DOCUMENTS

DE    100 51 306    4/2002

(Continued)

OTHER PUBLICATIONS

European Search Report dated May 10, 2007.

*Primary Examiner*—Roger Pang
(74) *Attorney, Agent, or Firm*—Cantor Colburn LLP

(57) ABSTRACT

Disclosed herein is an apparatus that relates to a gear set. The apparatus includes, a housing, a first gear movable in the housing such that a first axis defined by the first gear is repositionable relative to the housing, a second gear in mesh with the first gear, and a second axis defined by the second gear. The apparatus constrains movement of the first axis to a plane containing both the first axis and a line commonly perpendicular to the first axis and the second axis, and a biasing member that urges the first gear toward the second gear.

13 Claims, 14 Drawing Sheets

U.S. PATENT DOCUMENTS

| | | | |
|---|---|---|---|
| 4,748,865 A | 6/1988 | Umezawa et al. | |
| 4,777,411 A | 10/1988 | OConnor et al. | |
| 4,813,303 A | 3/1989 | Beezer et al. | |
| 4,827,790 A * | 5/1989 | Bisiach | 74/425 |
| 4,885,948 A | 12/1989 | Thrasher, Jr. et al. | |
| 4,979,404 A | 12/1990 | Nakata et al. | |
| 4,989,472 A | 2/1991 | James, Sr. et al. | |
| 4,993,277 A | 2/1991 | Adam et al. | |
| 5,027,024 A | 6/1991 | Slayton | |
| 5,186,068 A | 2/1993 | Heller | |
| 5,295,730 A | 3/1994 | Rees | |
| 5,415,595 A | 5/1995 | Nelson | |
| 5,445,238 A | 8/1995 | Chikuma et al. | |
| 5,472,060 A | 12/1995 | Sano et al. | |
| 5,475,930 A * | 12/1995 | Kimura | 33/290 |
| 5,488,851 A | 2/1996 | Rossi | |
| 5,794,480 A | 8/1998 | Schonsteiner | |
| 5,832,055 A | 11/1998 | Dewaele | |
| 5,834,662 A | 11/1998 | Stoll et al. | |
| 5,878,832 A | 3/1999 | Olgren et al. | |
| 5,887,353 A | 3/1999 | Beckingham | |
| 5,893,427 A | 4/1999 | Bohner et al. | |
| 5,934,144 A | 8/1999 | Marinkovic | |
| 5,992,259 A | 11/1999 | Fleytman | |
| 6,003,397 A | 12/1999 | Yasuhira | |
| 6,016,716 A | 1/2000 | Mauro | |
| 6,044,723 A | 4/2000 | Eda et al. | |
| 6,170,350 B1 | 1/2001 | Behm | |
| 6,272,942 B1 | 8/2001 | Gansesr | |
| 6,354,395 B1 | 3/2002 | Cheng et al. | |
| 6,357,313 B1 * | 3/2002 | Appleyard | 74/388 PS |
| 6,364,049 B1 | 4/2002 | Iwasaki et al. | |
| 6,386,059 B1 | 5/2002 | Mittendorf et al. | |
| 6,394,220 B1 | 5/2002 | Kurokawa et al. | |
| 6,460,650 B2 | 10/2002 | Tsuboi et al. | |
| 6,491,130 B1 | 12/2002 | Honaga et al. | |
| 6,505,071 B1 | 1/2003 | Zhu et al. | |
| 6,515,915 B2 | 2/2003 | Derner | |
| 6,520,042 B2 | 2/2003 | Jammer et al. | |
| 6,523,431 B2 | 2/2003 | Ozsoylu et al. | |
| 6,543,569 B1 | 4/2003 | Shimizu et al. | |
| 6,550,567 B2 | 4/2003 | Murakami et al. | |
| 6,639,760 B2 | 10/2003 | Dyer et al. | |
| 6,643,940 B1 | 11/2003 | Donath et al. | |
| 6,644,431 B2 | 11/2003 | Kuze et al. | |
| 6,679,350 B2 | 1/2004 | Shimizu et al. | |
| 6,705,176 B2 | 3/2004 | Ishii et al. | |
| 6,708,796 B2 * | 3/2004 | Kinme et al. | 180/444 |
| 6,725,964 B2 | 4/2004 | Appleyard | |
| 6,761,244 B2 | 7/2004 | Sano et al. | |
| 6,763,738 B1 * | 7/2004 | Tsutsui et al. | 74/388 PS |
| 6,769,507 B2 | 8/2004 | Murakami et al. | |
| 6,776,064 B2 | 8/2004 | Bucholz et al. | |
| 2002/0053249 A1 | 5/2002 | Jammer et al. | |
| 2002/0112555 A1 | 8/2002 | Chikaraishi et al. | |
| 2002/0148315 A1 | 10/2002 | Mittendorf et al. | |
| 2002/0189892 A1 | 12/2002 | Appleyard | |
| 2002/0195893 A1 | 12/2002 | Kobayashi et al. | |
| 2004/0026160 A1 | 2/2004 | Shimizu et al. | |
| 2004/0029671 A1 | 2/2004 | Bock et al. | |
| 2004/0029678 A1 | 2/2004 | Kayukawa et al. | |
| 2004/0084865 A1 | 5/2004 | Kitami et al. | |
| 2004/0094353 A1 | 5/2004 | Shimizu et al. | |
| 2004/0163881 A1 | 8/2004 | Shiina et al. | |
| 2004/0210365 A1 | 10/2004 | Tanaka et al. | |
| 2005/0097985 A1 * | 5/2005 | Kato | 74/813 L |
| 2005/0126333 A1 | 6/2005 | Dohles et al. | |
| 2008/0041178 A1 * | 2/2008 | Ozsoylu et al. | 74/425 |

FOREIGN PATENT DOCUMENTS

| | | |
|---|---|---|
| EP | 0 943 842 | 9/1999 |
| EP | 1468897 | 10/2004 |

* cited by examiner

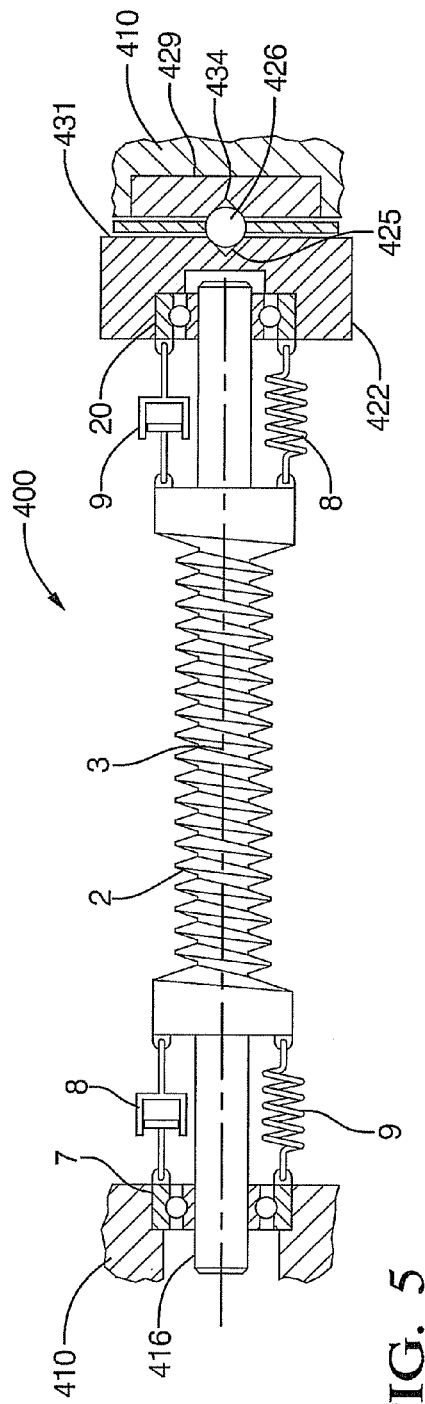
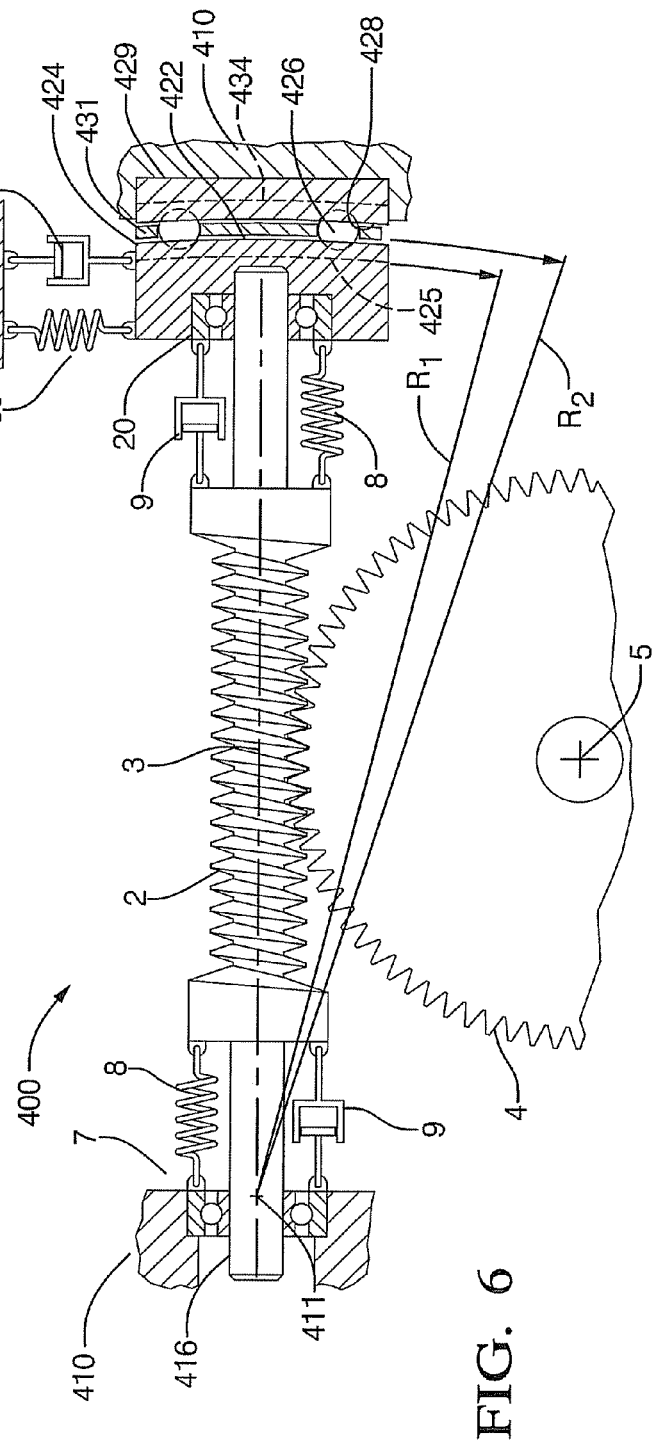
FIG. 5
FIG. 6

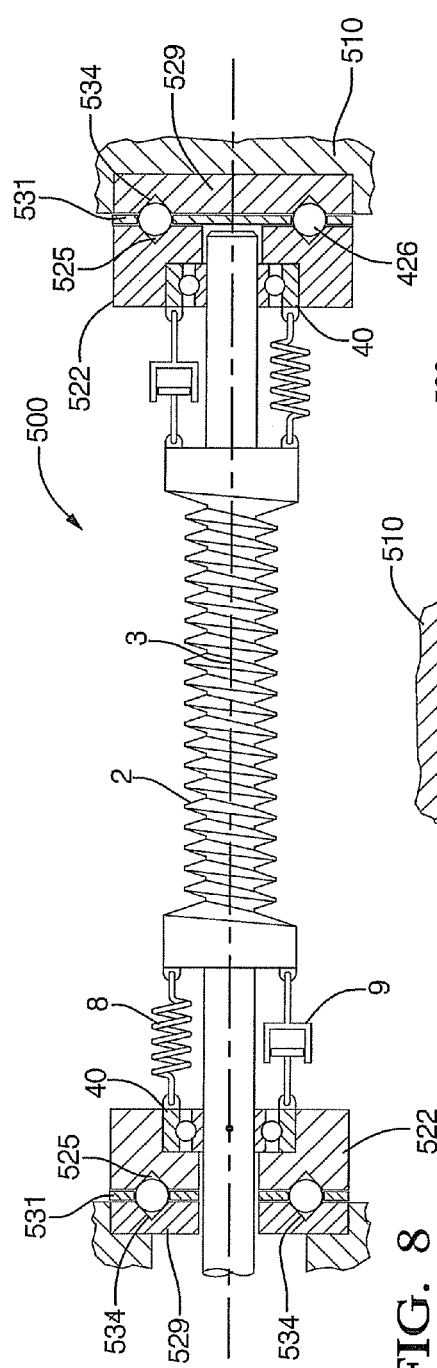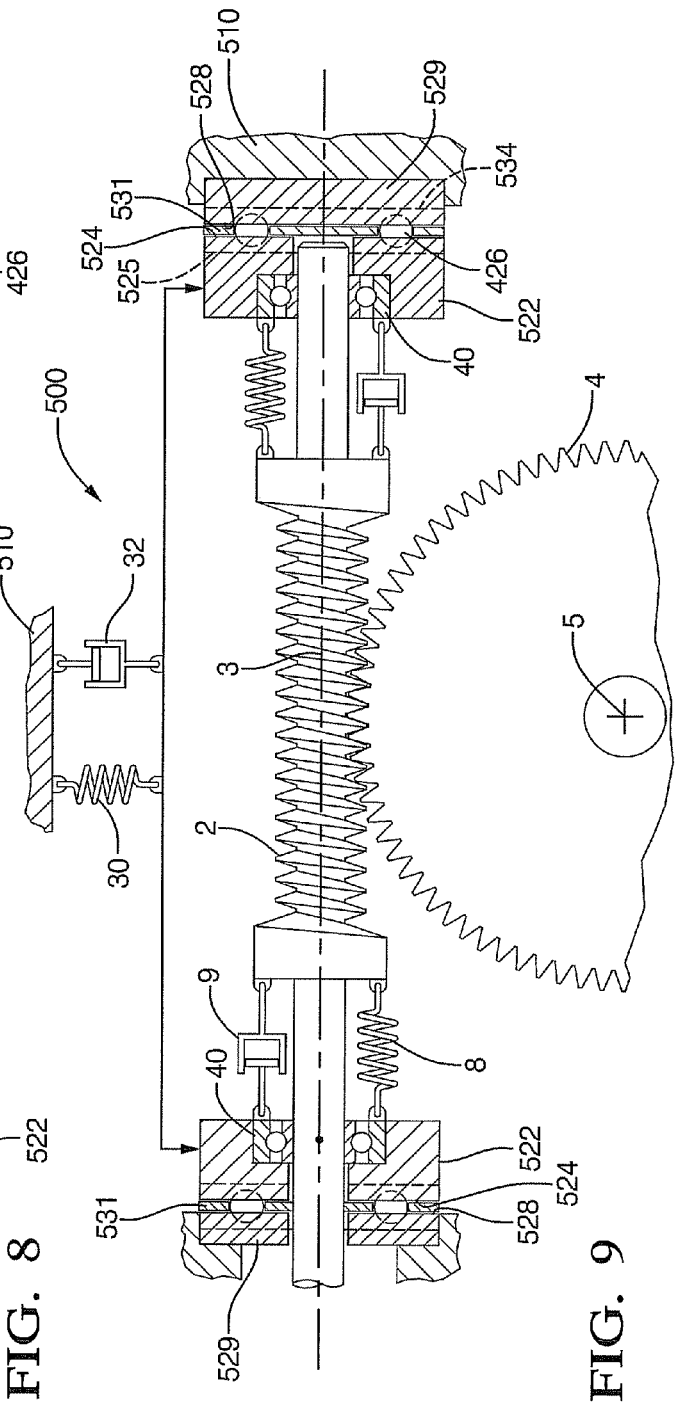
FIG. 8
FIG. 9

SPRUNG GEAR SET AND METHOD

CROSS REFERENCE TO RELATED APPLICATION

This application claims priority to U.S. provisional application 60/742,449, filed Dec. 5, 2005, the entire contents of which are incorporated herein by reference.

BACKGROUND OF THE INVENTION

Gear sets are useful devices for transmitting torque, and changing the direction of motion as well as changing the ratio of an input motion to that of an output motion. Clearance between the teeth of one gear and the teeth of a meshing gear is often referred to as backlash. At times, backlash may manifest itself as perceptible noise attributable to rattling of gear teeth as the teeth from one gear make contact with the teeth of a mating gear. The loudness and the annoyance associated with it are proportional to the amount of backlash present.

A certain amount of backlash is required and is intentionally built into gear systems to prevent energy loss due to friction. Much of the backlash is due to dimensional variations of the various components that make up the gear system. Additional backlash is created due to normal wear of components over time. As a result, the objectionable noise tends to increase as the parts wear and the clearances increase.

While gear play noise is not indicative of a defect in the gearing system, it often proves to be an annoyance and it is desirable to minimize it as much as practicable. Accordingly there is a need in the art for gear systems that automatically eliminate backlash due to build variations as well wear of the components.

BRIEF DESCRIPTION OF THE INVENTION

Disclosed herein is an apparatus that relates to a gear set. The apparatus includes, a housing, a first gear movable in the housing such that a first axis defined by the first gear is repositionable relative to the housing, a second gear in mesh with the first gear, and a second axis defined by the second gear. The apparatus constrains movement of the first axis to a plane containing both the first axis and a line commonly perpendicular to the first axis and the second axis, and a biasing member that urges the first gear toward the second gear.

Further disclosed herein is an apparatus that relates to a gear set. The apparatus includes, a first gear having teeth and a first shaft, a second gear having teeth and a second shaft, and the teeth of the second gear mesh with the teeth of the first gear. The apparatus also includes a housing and the second shaft is rotationally attached thereto, and the first shaft is rotationally and movably attached thereto. The apparatus is structured such that the movement of the first shaft is constrained to a plane containing both the first shaft and a line commonly perpendicular to the first shaft and the second shaft. The apparatus further includes a biasing member that urges movement of the first shaft toward the second shaft thereby maintaining continuous contact of the teeth of the first gear with the teeth of the second gear.

Further disclosed herein is a method of meshing gears. The method includes, urging a first gear into mesh with a second gear, and constraining movement of the first gear to a plane containing both an axis of the first gear and a line commonly perpendicular to the axis of the first gear and an axis of the second gear.

BRIEF DESCRIPTION OF THE DRAWINGS

The following descriptions should not be considered limiting in any way. With reference to the accompanying drawings, like elements are numbered alike:

FIGS. 5 and 6 depict an alternate schematic of a gear set disclosed herein;

FIGS. 8 and 9 depict an alternate schematic of a gear set disclosed herein;

DETAILED DESCRIPTION OF THE INVENTION

A detailed description of several embodiments of the disclosed apparatus and method are presented herein by way of exemplification and not limitation with reference to FIGS. 1 through 4.

Figure 1:
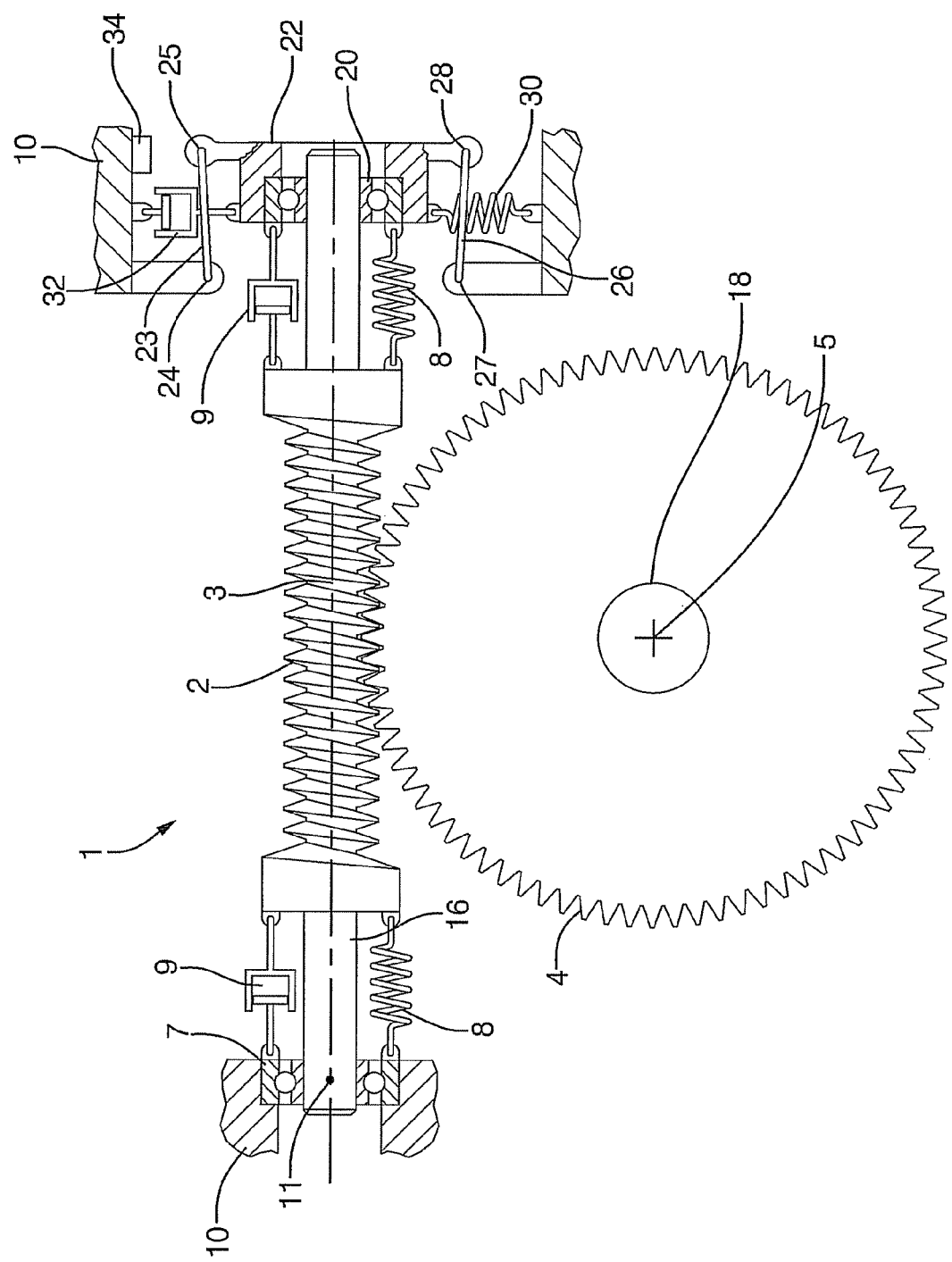
FIG. 1 depicts an exemplary schematic of a gear set with one movable bearing disclosed herein.

A schematic representation of the gear set apparatus 1 of one embodiment of the present invention is depicted in FIG. 1. A cross-axis gear set with, a first gear, worm 2 and a second gear, worm gear 4 are shown meshed together such that worm gear axis 5 and worm axis 3 form a 90 degree angle between the two gear axes when viewed along the direction of a line that is commonly perpendicular to each axis. Accordingly, rotation of worm 2 about worm axis 3 causes worm gear 4 to rotate about worm gear axis 5.

Both the worm 2 and the meshed worm gear 4 are located within a housing 10. The worm gear 4 and the axis 5 are held positionally constant relative to the housing 10, whereas, the worm 2 and the axis 3 are repositionable relative to the housing 10. The movement of the worm 2 and the axis 3 is restrained relative to the housing 10 and the worm gear 4 and the axis 5 such that the movement of the worm 2 and the worm axis 3 are constrained to a plane that contains both the worm axis 3 and a line commonly perpendicular to the worm axis 3 and the worm gear axis 5. Such an embodiment will, as should be appreciated by one skilled in the art, maintain a substantially constant angle between the two gear axes when viewed along the direction of a line commonly perpendicular to the two axes. It should also be appreciated by one skilled in the art that other cross-axis gears, such as non-enveloping helical, for example, may be used in place of the worm 2 and the worm gear 4 depicted in the embodiments of this disclosure, and that the shaft angle need not be 90 degrees, while remaining within the scope of the invention.

In one embodiment of the invention the worm gear 4 is fixed to a shaft 18 and has bearings (not shown) whose axis 5 orientation and location is fixed with respect to housing 10. Worm 2 is fixed to shaft 16 engaging pivot bearing 7 and bearing 20, such that it is free to rotate about worm axis 3. A pair of axial preload springs 8 and axial preload dampers 9, may be included to, load the worm 2 between the bearings 7 and 20 to prevent noise due to axial play, and provide shock attenuation. The bearings 7 and 20 on either end of the worm are mounted relative to the housing 10 in significantly different arrangements. Bearing 20 is fixedly attached to a bearing holder 22 that is repositionable relative to the housing 10. The repositioning of bearing 20 moves the worm 2 towards the worm gear 4 thereby eliminating any clearance (also known as backlash) between the teeth of the worm 2 and worm gear 4 resulting from build tolerances and component wear. This repositioning is controlled by a four-bar-linkage arrangement that is discussed further below. Alternately, pivot bearing 7 is not repositionable relative to the housing 10, however it allows the opposite end of the worm 2 located at bearing 20 to move thereby creating a virtual coupler pivot 11 substantially central to bearing 7.

In this particular embodiment, four-bar-linkage, comprising far link 23 and near link 26, connects the bearing holder 22 to the housing 10. The far link 23 is on the far side of the worm axis 3 from the worm gear 4, whereas the near link 26 is on the near side of the worm axis 3 from the worm gear 4. The far link 23 is rotationally attached to the housing 10 by far link inner pivot 24 and to the bearing holder 22 by far link outer pivot 25. The near link 26 is rotationally attached to the housing 10 by near link inner pivot 27 and to the bearing holder 22 by near link outer pivot 28. The axes of the four pivots, namely, the far link inner pivot 24, the far link outer pivot 25, the near link inner pivot 27 and the near link outer pivot 28 are each substantially perpendicular to the sprung worm axis 3 and contained within planes that are parallel to a plane formed by the fixed worm gear axis 5 and a line that is commonly perpendicular to both axes 5 and 3. Additionally the worm axis 3 is substantially midway between the far link inner pivot 24 and the near link inner pivot 27, similarly the worm axis 3 is substantially midway between the far link outer pivot 25 and the near link outer pivot 28. Thereby creating a four-bar-linkage that is symmetrical about axis 3.

The four-bar-linkage just described allows the bearing holder 22 to be moved about pivot bearing 7 resulting in the axis 3 pivoting about the virtual coupler pivot 11. The center of the virtual coupler pivot 11 is defined by the point where an extension of the far link 23 and the near link 26 would intersect. In an embodiment, the far link 23 and near link 26 may be set to create a virtual coupler pivot 11 that intersects the worm axis 3 at the center of the pivot bearing 7. A lateral hinge biasing force may also be incorporated in the link pivots of the four-bar-linkages to prevent lateral hinge rattle. Other embodiments may have a near link that is parallel to a far link, thereby not having an intersection of their extensions. In this case the center of the coupler pivot would be at infinity and the coupler motion would be substantially normal to axis 3.

The four-bar-linkage of an exemplary embodiment creates a center biasing force, more specifically, a force that acts to center the worm axis 3 midway between the far link inner pivot 24 and the near link inner pivot 27. Similarly, this biasing force acts to center the worm axis 3 midway between the far link outer pivot 25 and the near link outer pivot 28. It should be understood that an alternate embodiment could use this biasing force to force the worm 2 toward the worm gear 4. Such a biasing force, for example, could be created by moving the far link inner pivot 24 and the near link inner pivot 27 closer to the worm gear axis 5 such that they are not symmetrical about the worm axis 3, thereby forcing the gears toward one another. This bias force may act in concert with or replace the radial bias spring 30 and the radial bias damper 32 as well as the active radial devices that will be described in reference to FIGS. 15-17.

An embodiment of the invention depicted in FIG. 1 incorporates a radial biasing spring 30, positioned between the housing 10 and the bearing holder 22 which forces the worm axis 3 toward the worm gear axis 5. The radial biasing spring 30 may be a leaf, torsion, coil or other type of spring. The effective spring rate is a compromise between a desired low stiffness, to minimize radial preload sensitivity, and to automatically adjust for build tolerance and component wear, and a desired high stiffness to minimize raffle due to the natural frequency of the linkage/gear mechanism. A radial damper 32 is also positioned between the housing 10 and the bearing holder 22 to limit vibration amplitudes of the spring. One element could provide both spring stiffness and damping parameters.

Therefore, the radial biasing spring 30 and the radial damper 32 work together to position the bearing holder 22 and worm 2, offset from their nominal positions, toward the worm gear 4 to maintain zero clearance and backlash between the worm 2 and the worm gear 4 that would result due to manufacturing variations and component wear, that would result if worm axis 3 were fixed relative to worm gear axis 5. By eliminating the backlash, they also prevent noise that would result from the teeth of the worm 2 bouncing on and off from the teeth of the worm gear 4.

By being substantially perpendicular to the axis 3 of worm 2 the four link pivots 24, 25, 27 and 28 create a very high stiffness and strength of the worm 2 in the axial and transverse directions. Thus assuring movement of the worm 2 is constrained substantially perpendicular to the axis 5 of worm gear 4 in a plane orthogonal to the link pivot axes 24, 25, 27 and 28. This high stiffness, by keeping the worm 2 optimally oriented relative to the worm gear 4 aids in increasing efficiency and decreasing mesh loading. The third direction of motion, that in the radial direction of the worm 2 relative to the worm gear 4, can be independently set, as described above, to achieve the desired backlash elimination while minimizing gear-meshing friction.

Referring back to FIG. 1, a cushioned travel limiter 34 is positioned on the housing 10 to limit the travel of the bearing holder 22 in a radial direction. By limiting the travel of the bearing holder 22, the travel limiter 34 assures that a minimum mesh engagement of the worm 2 with the worm gear 4 will be maintained. By being cushioned, the cushioned travel limiter 34 minimizes contact noise when the bearing holder 22 makes contact with the travel limiter 34. Although the cushioned travel limiter 34 is positioned between the bearing holder 22 and the housing 10 in an exemplary embodiment, it could well have been positioned between either link 23 or 26 and the housing 10, or between either link 23 or 26 and the bearing holder 22 without deviating from the scope of the present invention.

Figure 2:
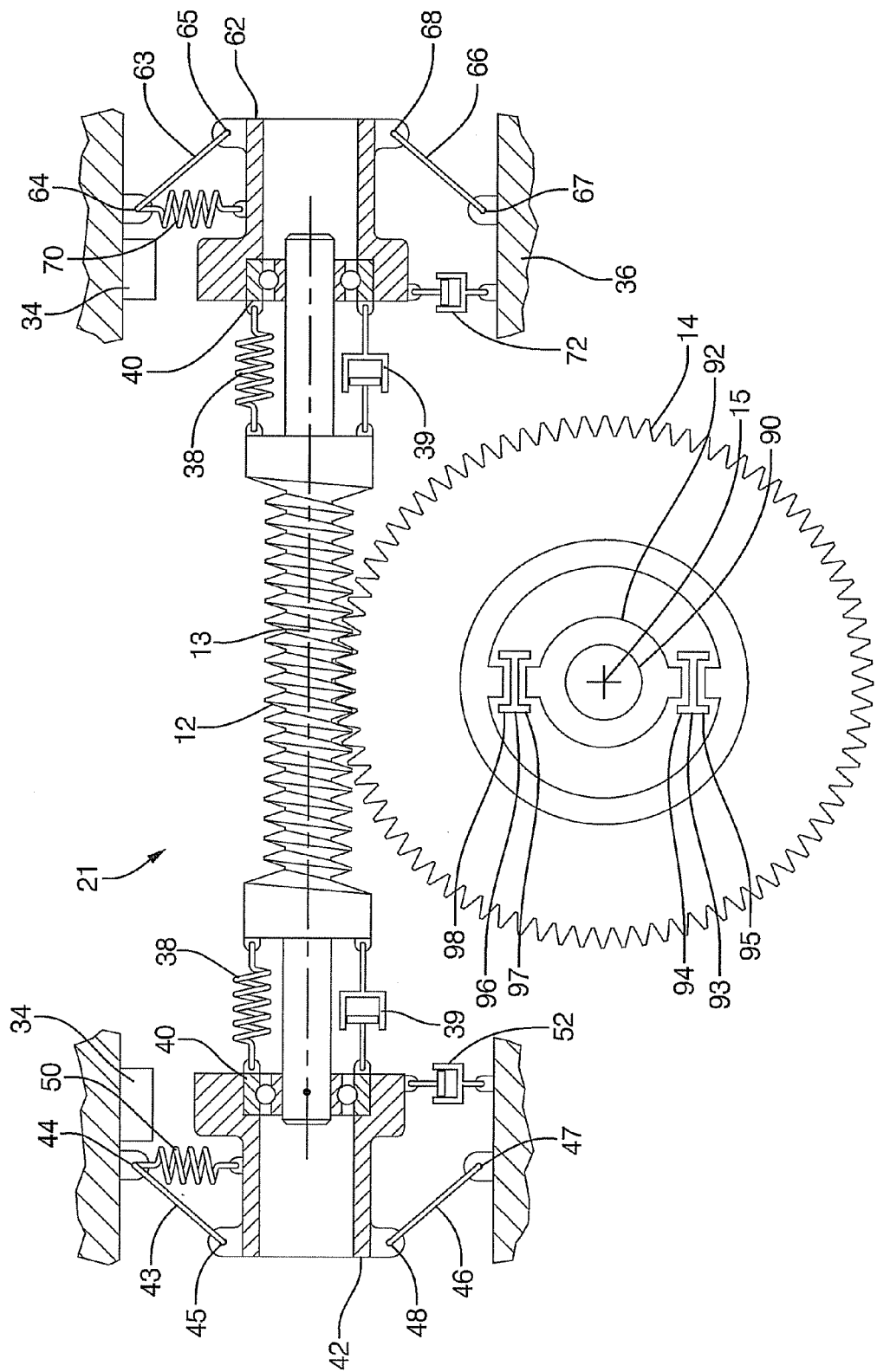
FIG. 2 depicts an alternate schematic of a gear set with multiple movable bearings disclosed herein.

Referring to FIG. 2, a schematic representation of another embodiment of the invention, gear set apparatus 21 is depicted. Whereas, in an embodiment of FIG. 1, only one of the two bearings of the worm 2 are movable, in an exemplary embodiment of FIG. 2, both bearings of the worm 12 are movable.

Two gears, worm gear 14 and worm 12 are shown meshed together with crossed-axis; such that worm gear axis 15 is maintained at a substantially constant shaft angle to worm axis 13. Accordingly, rotation of the worm 12 about worm axis 13 causes the worm gear 14 to rotate about the worm gear axis 15. The worm gear 14 is rotatable about bearing 90 that is movably attached to housing 36 which will be discussed in more detail below, it should be understood that the bearing 90 could be fixed relative to housing 36 while not departing from the scope of an embodiment of the present invention. Worm 12 is rotatably attached to bearings 40, such that it is free to rotate about the worm axis 13. A pair of axial preload springs 38 and axial preload dampers 39 may be included to load the worm 12 between the bearings 40 to prevent noise due to axial play and provide shock attenuation. These axial preload springs 38 and dampers 39 should be configured so as not to inhibit the motion of the worm axis 13 that will be discussed further below. The bearings 40 are fixedly attached to bearing holders 42 and 62 such that the worm 12 can rotate about worm axis 13, whereas bearing holders 42 and 62 cannot.

A four-bar-linkage, comprising far link 43 and near link 46, connects the bearing holder 42 to the housing 36. The far link 43 is on the far side of the worm axis 13 from the worm gear 14, whereas the near link 46 is on the near side of the worm axis 13 from the worm gear 14. The far link 43 is rotationally attached to the housing 36 by far link inner pivot 44 and to the bearing holder 42 by far link outer pivot 45. The near link 46 is rotationally attached to the housing 36 by near link inner pivot 47 and to the bearing holder 42 by near link outer pivot 48. The four pivots, namely, the far link inner pivot 44, the far link outer pivot 45, the near link inner pivot 47 and the near link outer pivot 48 are substantially perpendicular to the worm axis 13. Additionally the worm axis 13 is substantially midway between the far link inner pivot 44 and the near link inner pivot 47, similarly the worm axis 13 is substantially midway between the far link outer pivot 45 and the near link outer pivot 48. Thereby creating a four-bar-linkage that is symmetrical about axis 13.

The opposite end of the worm 12 is set up similarly with a four-bar-linkage, comprising far link 63 and near link 66, connects the bearing holder 62 to the housing 36. The far link 63 is on the far side of the worm axis 13 from the worm gear 14, whereas the near link 66 is on the near side of the worm axis 13 from the worm gear 14. The far link 63 is rotationally attached to the housing 36 by far link inner pivot 64 and to the bearing holder 62 by far link outer pivot 65. The near link 66 is rotationally attached to the housing 36 by near link inner pivot 67 and to the bearing holder 62 by near link outer pivot 68. The axes of the four pivots, namely, the far link inner pivot 64, the far link outer pivot 65, the near link inner pivot 67 and the near link outer pivot 68 are each substantially perpendicular to the sprung worm axis 13 and contained within planes parallel to a plane containing the fixed worm gear axis 15. Additionally the worm axis 13 is substantially midway between the far link inner pivot 64 and the near link inner pivot 67, similarly the worm axis 13 is substantially midway between the far link outer pivot 65 and the near link outer pivot 68. Thereby creating a four-bar-linkage that is symmetrical about axis 13.

The relative positions of the pivots of the links for the aforementioned four-bar-linkages can create a centering biasing force for the worm axis 13 or an offsetting biasing force of worm axis 13. This biasing force can be designed to maintain zero clearance between the teeth of the worm 12 and the teeth of the worm gear 14 that would exist due to build variation or develop over time due to wear if the worm axis 13 were fixed relative to the worm gear axis 15. Thereby eliminating the need for additional components to create a biasing force to force the teeth of the worm 12 toward the teeth of the worm gear 14.

Additionally radial biasing spring 50, 70 and radial dampers 52, 72 can be incorporated to force the worm 12 toward the worm gear 14 to maintain zero clearance between the teeth of the worm 12 and the teeth of the worm gear 14 that would exist due to build variation or develop over time due to wear if the worm axis 13 were fixed relative to the worm gear axis 15. The effective spring rate for the radial biasing springs 50, 70 is a compromise between a desired low stiffness, to minimize radial preload sensitivity, and to automatically adjust for build tolerance and component wear, and a desired high stiffness to minimize rattle due to the natural frequency of the linkage/gear mechanism. The radial biasing spring force and the radial damping could be performed by a single component located on either end of the worm 12.

By being substantially perpendicular to the axis 13 of worm 12 the eight link pivots 44, 45, 47, 48, 64, 65, 67 and 68 create a very high stiffness and strength of the worm 12 in the axial and transverse directions. This high stiffness, by keeping the worm 12 optimally oriented relative to the worm gear 14, aids in increasing efficiency and mesh loading. The motion in the radial direction of the worm 12 relative to the worm gear 14 can be independently set, as described above, to achieve the desired backlash elimination while minimizing gear-meshing friction.

Figure 3:
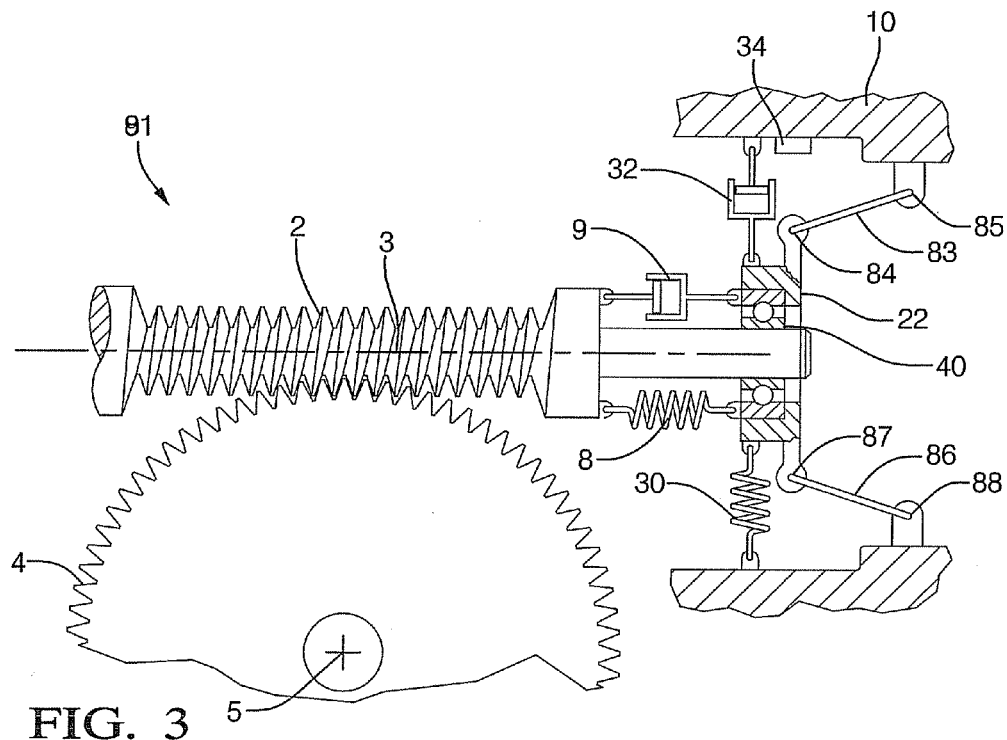
FIG. 3 depicts an alternate schematic of a gear set disclosed herein.

An embodiment of gear set apparatus 81 of FIG. 3 performs the same function as an embodiment of gear set apparatus 1 of FIG. 1. As such, the same notational symbols are used for components that have not changed between the two figures. The primary difference between an embodiment shown in FIG. 3 and that of FIG. 1 is the links 23, 26 of the four-bar-linkages of FIG. 1 extend from the bearing holder 22 toward the worm 2 whereas, the links 83, 86 of FIG. 3 extend from the bearing holder 22 away from the worm 2. The following detailed description will cover only the unique portions of FIG. 3.

A four-bar-linkage, comprising far link 83 and near link 86, connects the bearing holder 22 to the housing 10. The far link 83 is on the far side of the worm axis 3 from the worm gear 4, whereas the near link 86 is on the near side of the worm axis 3 from the worm gear 4. The far link 83 is rotationally attached to the housing 10 by far link outer pivot 85 and to the bearing holder 22 by far link inner pivot 84. The near link 86 is rotationally attached to the housing 10 by near link outer pivot 88 and to the bearing holder 22 by near link inner pivot 87. The axes of the four pivots, namely, the far link inner pivot 84, the far link outer pivot 85, the near link inner pivot 87 and the near link outer pivot 88 are substantially perpendicular to the sprung worm axis 3 and contained within planes parallel to a plane containing the fixed worm gear axis 5. Additionally the worm axis 3 is positioned closer to the far link inner pivot 84 and further from the near link inner pivot 87, this is done to assure that the perturbing force of the linkage acts to push the worm 2 towards the worm gear 4. Thereby creating a four-bar-linkage that is asymmetrical about axis 3.

The four-bar-linkage just described allows the bearing holder 22 to be moved rotationally about pivot bearing 7 resulting in the axis 3 pivoting about the virtual coupler pivot 11 (see FIG. 1). The center of the virtual coupler pivot 11 is defined by the point where an extension of the far link 83 and the near link 86 would intersect. In an exemplary embodiment, the far link 83 and near link 86 have been set to create a virtual coupler pivot 11 that intersects the worm axis 3 at the center of the pivot bearing 7.

The four-bar-linkage of FIG. 3 creates a biasing force that perturbs the worm axis 3 away from the center, more specifically, a force that acts to urge the worm axis 3 away from the midpoint between the far link inner pivot 84 and the near link inner pivot 87.

A cushioned travel limiter 34 is positioned on the housing 10 to limit the travel of the bearing holder 22 in a radial direction. By limiting the travel of the bearing holder 22, the travel limiter 34 assures that a minimum mesh engagement of the worm 2 with the worm gear 4 will be maintained. By being cushioned, the cushioned travel limiter 34 minimizes contact noise when the bearing holder 22 makes contact with the travel limiter 34. Although the cushioned travel limiter 34 is positioned between the bearing holder 22 and the housing 10 in an embodiment, it could well have been positioned between either link 83 or 86 and the housing 10, or between either link 83 or 86 and the bearing holder 22 without deviating from the scope of the present invention.

Figure 4:
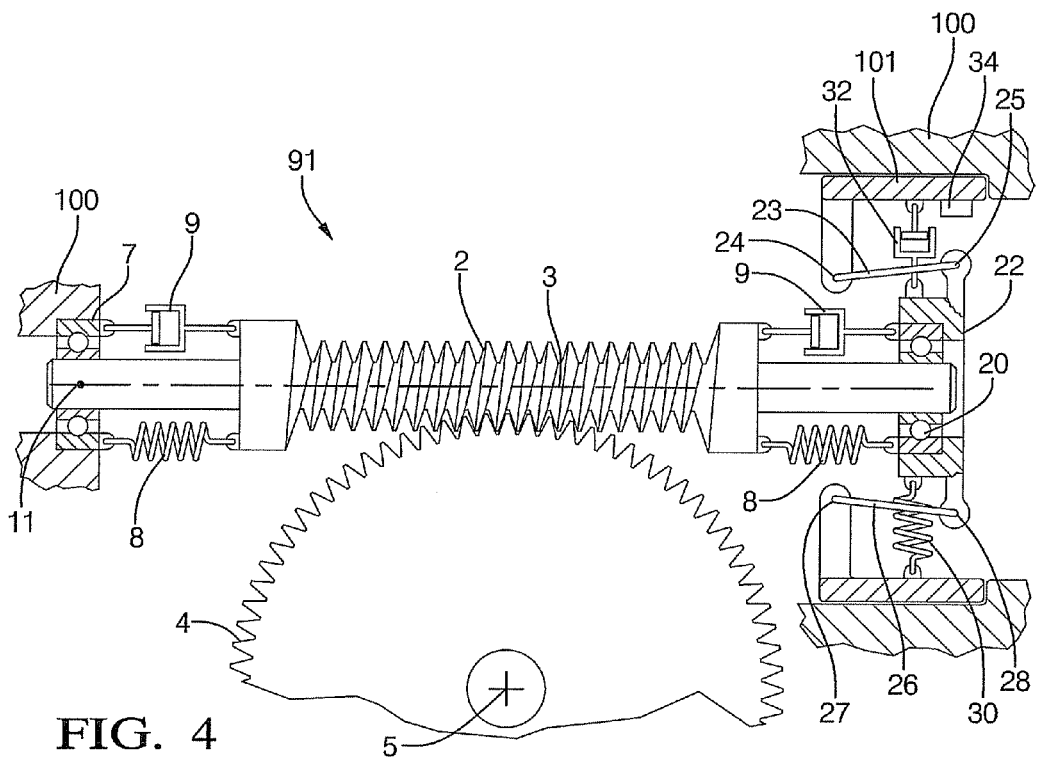
FIG. 4 depicts an alternate schematic of a gear set with a movable bearing attached to a sleeve disclosed herein.

An embodiment of gear set apparatus 91 of FIG. 4 performs the same function as an embodiment of gear set apparatus 1 of FIG. 1. As such, the same notational symbols are used for components that have not changed between the two figures. The primary difference between an embodiment shown in FIG. 4 and that of FIG. 1 is the addition of a sleeve 101 between the bearing holder 22 and the housing 100 in FIG. 4. Instead of the four-bar-linkage connecting the bearing holder 22 to the housing 100 directly, it connects to the sleeve 101 that is fixedly attached to the housing 100. An embodiment incorporating a sleeve 101 could be assembled as a subassembly prior to installation into the housing 100 similar to how a prior art gear set apparatus, without a movable bearing (not shown), would be installed into the housing 100.

Although the aforementioned outward extending four-bar-linkage has been described in reference to an embodiment of a gear set apparatus with one movable bearing and one pivoting bearing it should be understood that such an outward extending four-bar-linkage could also be applied to an embodiment of a gear set apparatus with movable bearings on both ends of the repositionable gear, similar to that shown in FIG. 2, without deviating from the scope of the present invention.

Additionally an embodiment of the present invention could also incorporate a four-bar-linkage having; one link extending inward and the other extending outward, links that are not parallel, and links that are not of equal length while still being covered by the scope of the present invention.

An embodiment of the present invention with the axes of both gears movable relative to the housing is also depicted in FIG. 2. The movability of axis 13 of worm 12 was described in detail above. The worm gear 14 with axis 15 and bearing 90 is movable relative to housing 36 through a four-bar-linkage. The four-bar-linkage, comprising far link 93 and near link 96, connects the bearing holder 92 to the housing 36. The far link 93 is on the far side of the worm gear axis 15 from the worm 12, whereas the near link 96 is on the near side of the worm gear axis 15 from the worm 12. The far link 93 is rotationally attached to the housing 36 by far link outer pivot 95 and to the bearing holder 92 by far link inner pivot 94. The near link 96 is rotationally attached to the housing 36 by near link outer pivot 98 and to the bearing holder 92 by near link inner pivot 97. The four pivots, namely, the far link inner pivot 94, the far link outer pivot 95, the near link inner pivot 97 and the near link outer pivot 98 are substantially perpendicular to the worm gear axis 15. Additionally the worm gear axis 15 is substantially midway between the far link inner pivot 94 and the near link inner pivot 97, similarly the worm gear axis 15 is substantially midway between the far link outer pivot 95 and the near link outer pivot 98. Thereby creating a four-bar-linkage that is symmetrical about axis 15.

Referring to FIGS. 5 and 6 a top and side view of a schematic representation of an alternate embodiment of a gear set apparatus is shown generally at 400. Similar to the construction of the embodiment of FIG. 1, in the embodiment of FIGS. 5 and 6 only one of the two bearings of the worm is movable. In the gear set apparatus 400 a cross-axis gear set with, the first gear, worm 2, and the second gear, worm gear 4, are shown meshed together such that worm gear axis 5 and worm axis 3 form substantially a 90 degree angle to one another when viewed along the direction of a line that is commonly perpendicular to each axis. Accordingly, rotation of worm 2 about worm axis 3 causes worm gear 4 to rotate about worm gear axis 5.

Both the worm 2 and the worm gear 4 that the worm 2 is meshed with are located within a housing 410. The worm gear 4 and the axis 5 are held positionally constant relative to the housing 410, whereas, the worm 2 and the axis 3 are repositionable relative to the housing 410. The movement of the worm 2 and the axis 3 is constrained relative to the housing 410, to the worm gear 4, and to the worm gear axis 5 such that the movement of the worm 2 and the worm axis 3 are limited to a plane that contains both the worm axis 3 and a line commonly perpendicular to the worm axis 3 and the worm gear axis 5. The gear set 400 will maintain a substantially constant angle between the two gear axes when viewed along the direction of a line commonly perpendicular to the two axes 5, 3. Alternate cross-axis gear sets, such as non-enveloping helical, for example, may be used in place of the worm 2 and the worm gear 4 depicted in embodiments of this disclosure. Additional embodiments may have shaft angles other than 90 degrees while remaining within the spirit and scope of the present invention.

In an exemplary embodiment of the invention the worm gear 4 is fixed to a shaft 8 and has bearings (not shown) whose axis 5 orientation and location is fixed with respect to housing 410. Worm 2 is fixed to shaft 416 engaging pivot bearing 7 and bearing 20, such that it is free to rotate about worm axis 3. A pair of axial preload springs 8 and axial preload dampers 9, may be included to, load the worm 2 between the bearings 7 and 20 to prevent noise due to axial play and to provide shock attenuation. The bearings 7 and 20 on either end of the worm are mounted relative to the housing in significantly different arrangements. Bearing 20 is fixedly attached to a bearing holder 422 that is repositionable relative to the housing 410. The repositioning of bearing 20 can move the worm 2 toward or away from the worm gear 4. When the worm 2 is moved toward the worm gear 4 the movement may eliminate any clearance (also known as backlash) between the teeth of the worm 2 and worm gear 4 that may exist from build tolerances or from component wear, for example. The bearing 20 repositioning is controlled by a ball bearing 426 and V-shaped grooves 425 and 434 arrangement that will be described in detail below. The other worm bearing, namely pivot bearing 7, is not repositionable relative to the housing 410, however it does allow the opposite end of the shaft 416 located at the repositionable bearing 20 to move thereby creating a center point 411 substantially central to bearing 7.

The bearing 20 is connected to bearing holder 422 that includes an outward facing arcuate surface 424 with radius R1 and center point 411. A plurality of ball bearings 426 are positioned between the outward facing arcuate surface 424 and an inward facing arcuate surface 428 of a cap 429 fixed to the housing 410. The inward facing arcuate surface 428 has a radius of R2 and shares the center point 411 of the outward facing arcuate surface 424. The ball bearings 426 are held positionally by a ball carrier 431 positioned between the outward facing arcuate surface 424 and the inward facing arcuate surface 428. The groove 434, formed in the surface 428, and the companion groove 425, formed in surface 424; create a track for the ball bearings 426 so that the motion of the bearing holder 422 is in a single plane. The plane is such that it contains the worm axis 3 and a line commonly perpendicular to both the worm axis 3 and the worm gear axis 5. It should be noted that alternate embodiments could have a plurality of grooves and the grooves could have shapes other than the V-shape disclosed above. Additionally, alternate embodiments could use surfaces 424 and 428 that are substantially flat surfaces, such that R1=R2=infinity, while still remaining within the scope of the present invention.

A biasing member urges the bearing holder 422, depicted herein as the compression spring 30, in a radial direction toward the worm gear 4. In addition to the biasing of the bearing holder 422 the damper 32 is positioned between the housing 410 and the bearing holder 422 to dampen any movement of the bearing holder 422 in a direction away from the gear 4. This resistance to movement of the bearing holder 422 will resist the formation of backlash between the two gears 2 and 4 that could result if the bearing holder 422 were permitted to freely move away from the gear 4. Such assemblies as, the hydraulic damper assembly 110, the magnetorheological damper assembly 210 and the pancake solenoid assembly 310, for example, could replace the spring 30 and the damper 32 in alternate embodiments, while remaining within the spirit and scope of the present invention.

Figure 7:
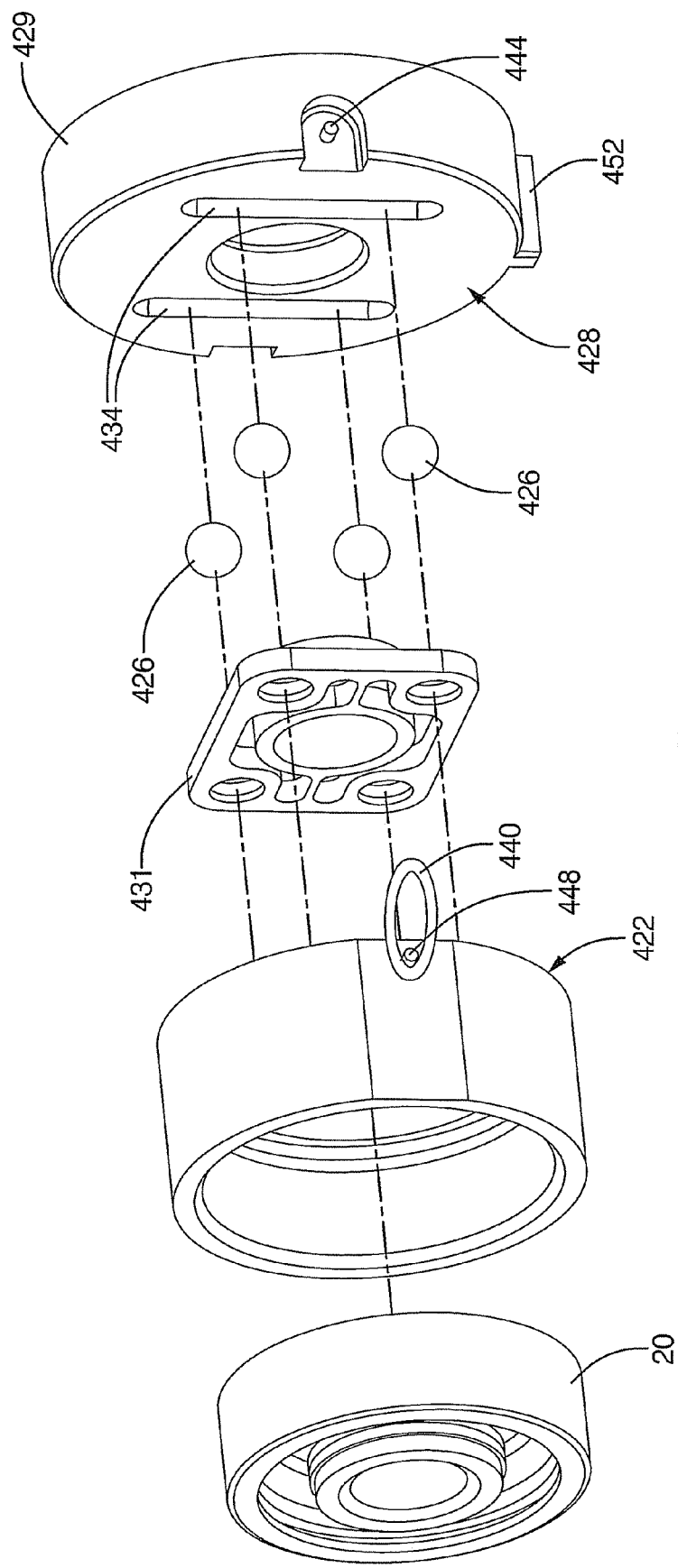
FIG. 7 depicts an exploded view of a bearing to cap assembly disclosed herein.

Referring now to FIG. 7 an embodiment of the bearing 20, the bearing holder 422, the carrier 431, the ball bearings 426, and the cap 429 are shown in a perspective exploded view. For purposes of ease of handling and simplified assemblability of the gear set apparatus 400 into the housing 410 the gear set apparatus 400 can be built and handled as a subassembly. The bearing 20 is press fitted into the bearing holder 422. The carrier 431 and ball bearings 426 are sandwiched between the bearing holder 422 and the cap 429 with the ball bearings 426 riding in grooves 434 formed in the cap 429 and companion grooves 425 formed in holder 422. A pair of elastic members 440, located on substantially opposite sides of the cap 429 from one another, holds the cap 429 to the bearing holder 422. Each elastic member 440 engages a protruding pin 444 on the cap 429 and a protruding pin 448 on the bearing holder 422 such that the elastic members 440 urge the cap 429 toward the bearing holder 422. The cap 429 has a tab 452 that extends radially outwardly to engage with a key way (not shown) in the housing 410 to prevent rotation of the cap 429 relative to the housing 410.

Referring to FIGS. 8 and 9, an alternate embodiment gear set 500 has both bearings of the worm repositionable relative to a housing 510. The gear set 500 uses the ball bearings 426, riding in grooves 534 of caps 529, and grooves 525 of bearing holder 522, on both ends of the worm 2, to allow the movable bearings 40 to move relative to the housing 510. In the gear set 500, however, unlike that of gear set 400, the bearings 40 on both ends of the worm 2 are movable relative to the housing 510. A ball bearing carrier 531 is positioned between substantially planar surfaces 524, of the bearing holders 522, and planar surfaces 528, of the caps 529, on both ends of the worm 2. The grooves 534, formed in surface 528, and the grooves 525, formed in surface 524, provide linear paths for the ball bearings 426 to track within constraining the movement of the worm 2 to a plane that is perpendicular to the axis 5 of the worm gear 4. More specifically the travel of the worm axis 3 is constrained to a plane containing both the worm axis 3 and a line commonly perpendicular to the worm axis 3 and the worm gear axis 5.

The biasing member 30, depicted here as a compression spring, and the damper 32 are functionally connected between the bearing holders 522 and the housing 510. The biasing member 30 and the damper 32 may include more than one of each, for example, a pair of biasing members 30 and a pair of dampers 32 may be employed in a single gear set 500. In such case one of the pair of biasing members 30 and one of the pair of dampers 32 may be functionally connected between the bearing holder 522 on one end of the worm 2 and the housing 510 while the other biasing member 30 of the pair and the other damper 32 of the pair is functionally connected between the other bearing holder 522 and the housing 510, for example. Regardless of the number of biasing members 30 and dampers 32 used their purpose is to urge the worm 2 toward the worm gear 4 and to damp any motion of the worm 2 in a direction away from the worm gear 4.

Figure 10:
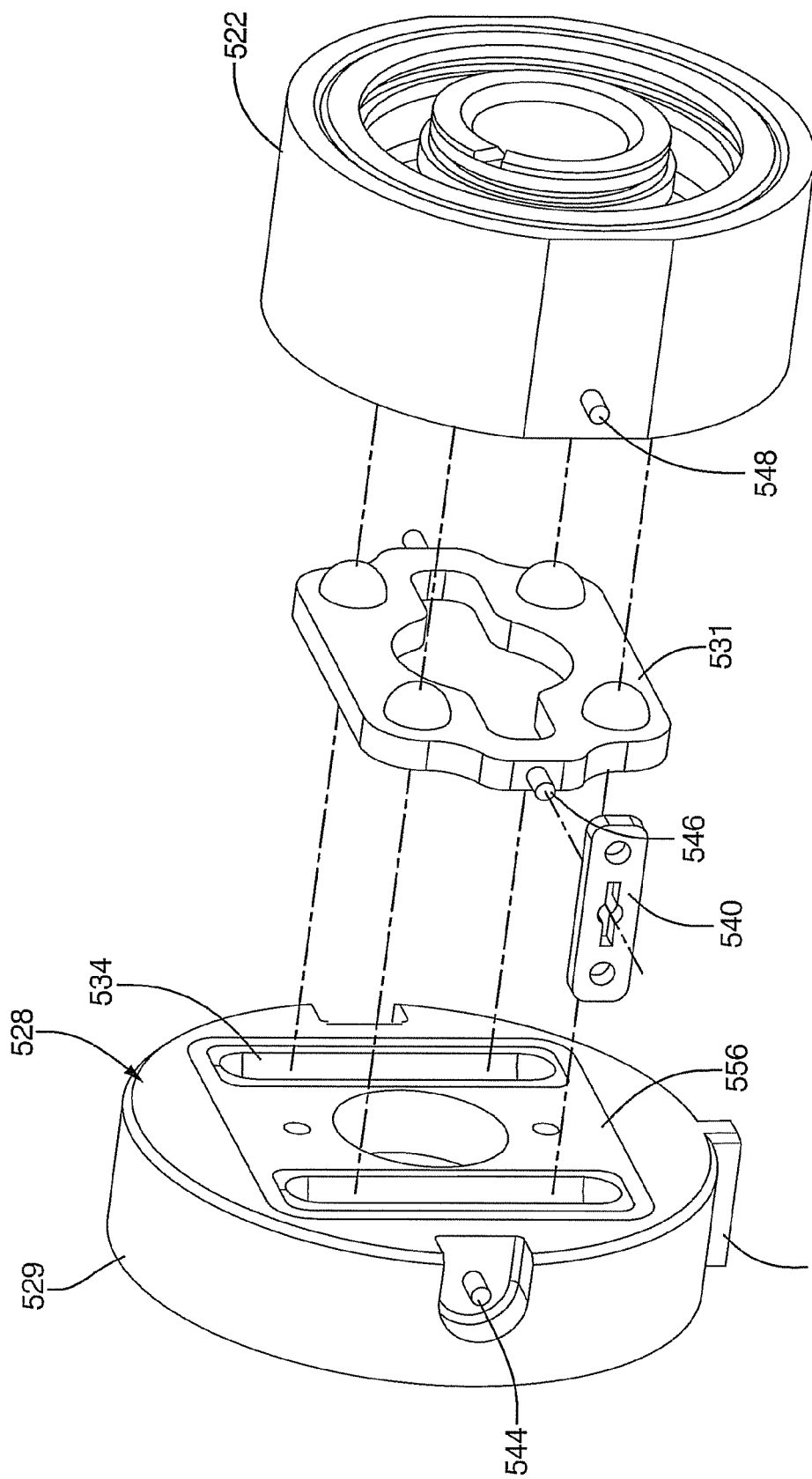
FIG. 10 depicts an exploded view of an alternate embodiment of a bearing to cap assembly disclosed herein.

Referring now to FIG. 10 an embodiment of the bearing holder 522, the carrier 531, the ball bearings 426, and the cap 529 are shown in a perspective exploded view. For purposes of ease of handling and simplified assemblability of the gear set apparatus 500 into the housing 510 the gear set apparatus 500 can be built and handled as a subassembly. The bearing 40 is press fitted or insert molded into the bearing holder 522. The carrier 531 and ball bearings 426 are sandwiched between the bearing holder 522 and the cap 529 with the ball bearings 426 riding in grooves 534 formed in the cap 529 and grooves 525 formed in the holder 522. A pair of carrier control links 540, located on substantially opposite sides of the cap 529 from one another, hold the cap 529 to the bearing holder 522. Each carrier control link 540 engages a protruding pin 544, on the cap 429, a protruding pin 548, on the bearing holder 522, and a protruding pin 546, on the carrier 531, such that the carrier control links 540 maintain the location of the carrier 531 relative to the cap 529 and the bearing holder 522. The cap 529 has a tab 552 that extends radially outwardly to engage with a key way (not shown) in the housing 510 to prevent rotation of the cap 529 relative to the housing 510. An alternative embodiment of the invention could have the grooves 525, 434 formed into inserts 556 that are attached to the holder 522 and the cap 529 by a process such as insert-molding, for example.

Figure 11:
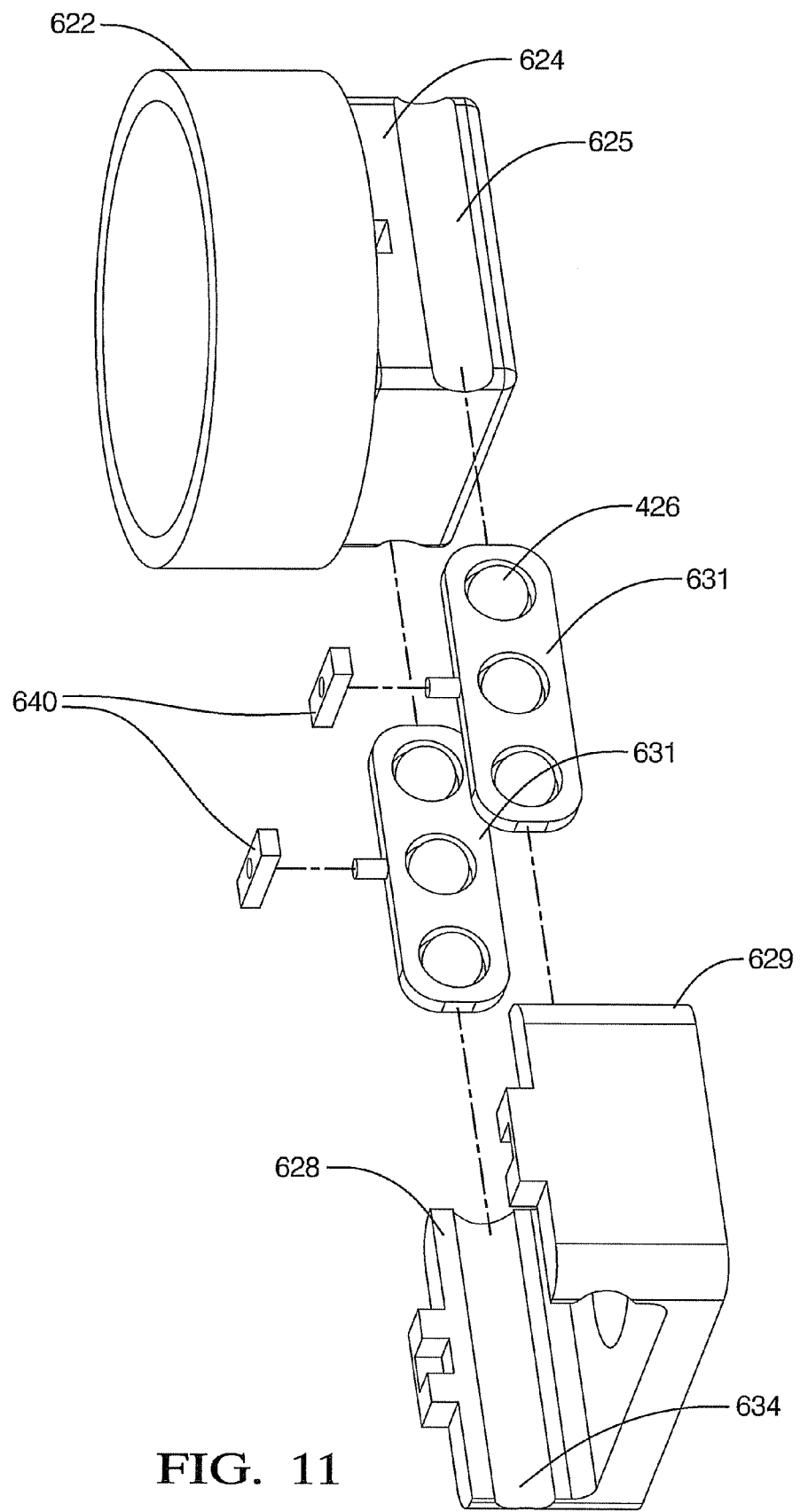
FIG. 11 depicts an exploded view of an alternate embodiment of a bearing to cap assembly disclosed herein.

Referring to FIG. 11, an alternate embodiment of a bearing holder to cap assembly is shown in a perspective exploded view. A bearing holder 622 has grooves 625 in surfaces 624 on opposing lateral sides thereof. Carriers 631 hold the ball bearings 426 positionally relative to one another and are pinned to the holder 622 with carrier control links 640. The carrier control links 640 are also engaged with the cap 629 to thereby orient the cap 629 relative to the holder 622 and the ball bearings 426. Grooves 634 in surfaces 628 of the cap 629 provide tracks for the ball bearings 426 to roll within. In this embodiment the ball bearings 426 are loaded in shear between grooves 625 and 634 by the axial force between the holder 622 and a housing (not shown) to which the cap 629 is attached. The grooves 625, 634 are depicted herein as straight tracks; however, arcuate grooves could also be utilized to create a curved track for the ball bearings 426 to travel within.

Figure 12:
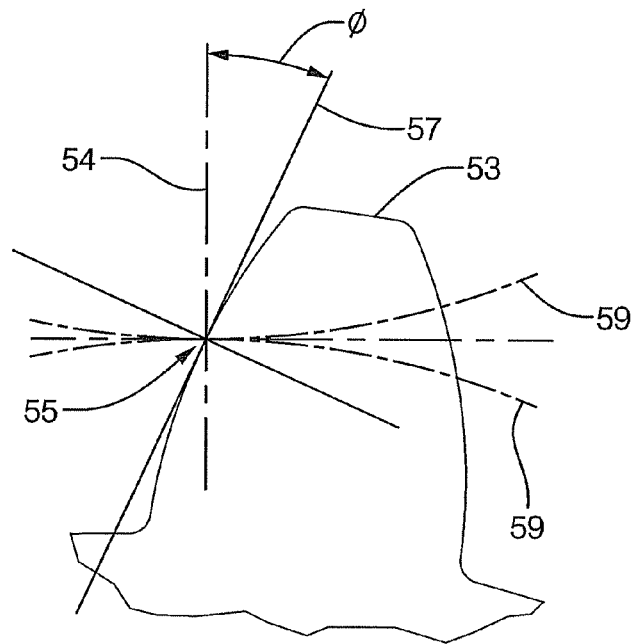
FIG. 12 depicts a gear tooth showing a contact point disclosed herein.

Referring to FIG. 12, for optimum efficiency and mesh loading it is desirable to constrain the worm axis 3 to a plane defined as a plane including both the worm axis 3 and a line commonly perpendicular to the worm axis 3 and the worm gear axis 5 at all times. In doing so, the contact point 55 of a tooth 53 of one gear to that of the meshing gear (not shown)

is maintained at the intersection of the pitch diameters 59 of the two gears and a commonly perpendicular line 54 connecting the two gear axes 3 and 5.

Figure 13:
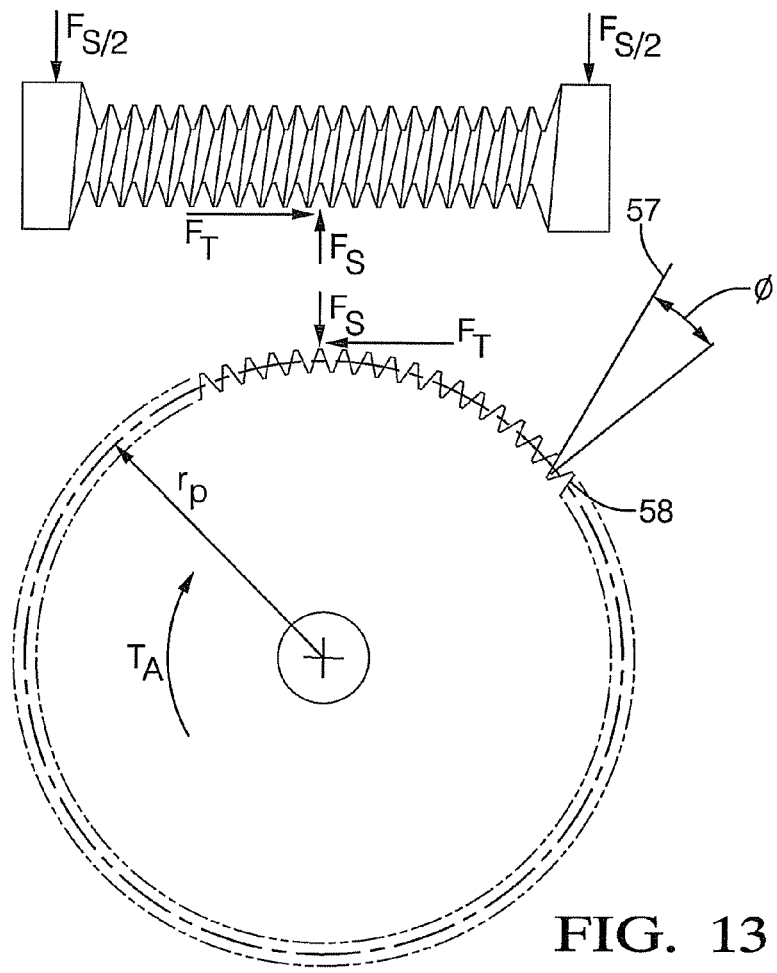
FIG. 13 is a force diagram of two gears meshing disclosed herein.

Although the force of the radial bias spring 30 is in a direction to force the teeth of the two meshing gears into each other, it may be possible under severe conditions for forces to overcome this spring force resulting, temporarily, in backlash that may permit rattling between the teeth of the gears resulting in audible noise. Referring now to FIG. 13, a force diagram of two meshed gears showing the forces that may cause momentary separation of gears is shown. Since the tangent plane 57 of the two gears at the contact point 55 is not parallel to the commonly perpendicular line 54 passing through the axes of both gears there will be a force acting in a direction to separate the meshed gears. The separation force $F_s$ can be found from the equation:

$$F_s = \left(\frac{T_A}{r_p}\right)\operatorname{Tan}\phi. \tag{1}$$

Where: $T_A$ is the torque acting on the worm gear, $r_p$ is the radius of the contact point for the worm gear, and $\phi$ is the angle between a radial line and the tangent plane 57 of gear teeth 58, which is also referred to as the pressure angle. Since $F_s$ is the force acting to separate the two gears, and the worm has two substantially equal spaced bearings 7 and 20, in a simple analysis, the force acting on either bearing 7 or 20 is half the separation force $F_s$. Therefore, a worm gear torque $T_A$ large enough to create a separation force $F_s$ equal to twice the force of that of the radial spring 30 may be sufficient to compress the radial spring 30 resulting in backlash and the potential for rattle noise. It should be noted that this analysis does not take into consideration a difference between separation forces on each end of the worm 2 that results from a worm pitch radius or a nonsymmetrical distribution of bearing loads that may result from an axial component of the contact force. Descriptions that take these factors into consideration will be presented below.

Figure 14:
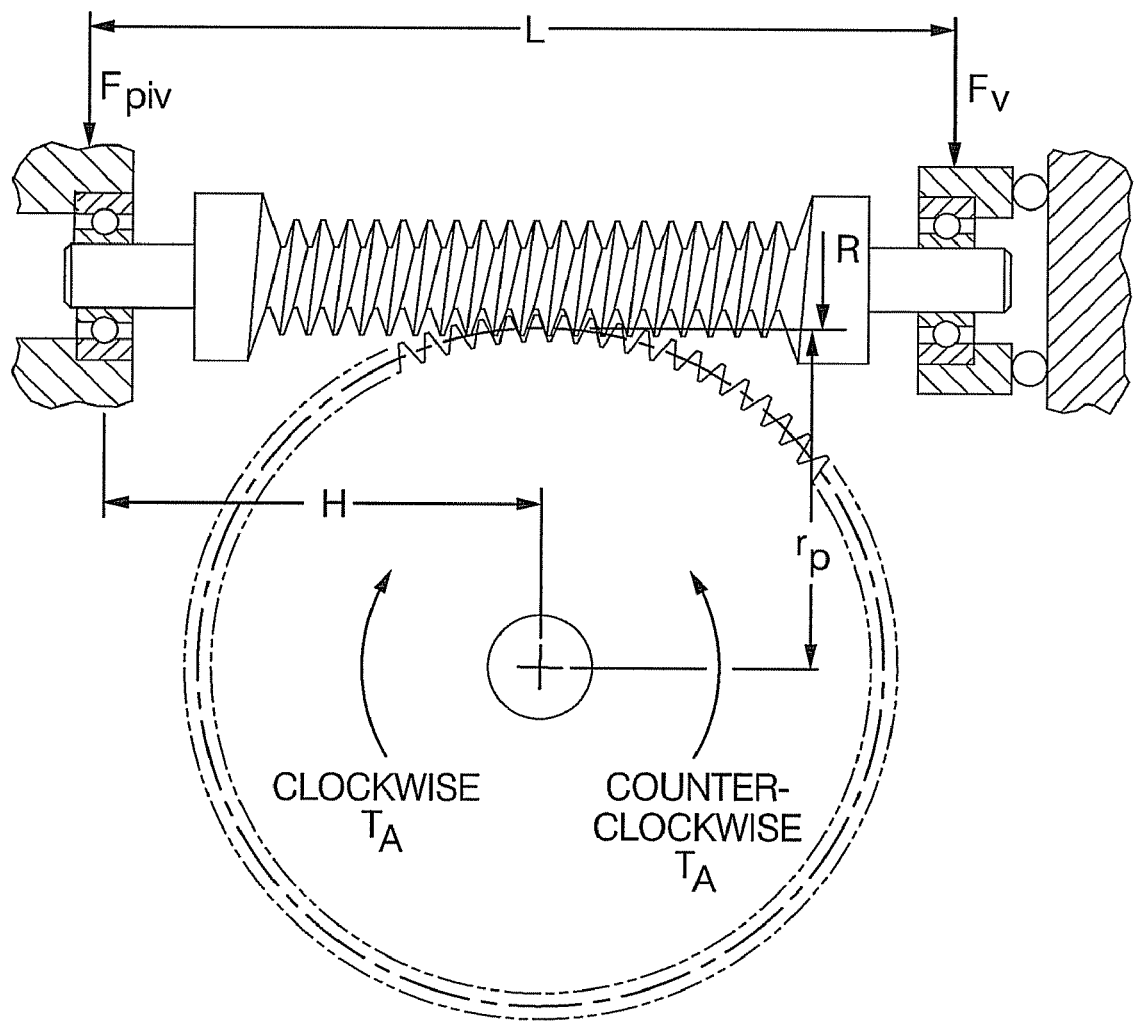
FIG. 14 depicts an alternate force diagram of two gears meshing disclosed herein.

Referring to FIG. 14 a portion of the separation force positioned at a movable bearing, that is generated by a contact force is labeled as $F_V$, and can be expressed in terms of the variables shown, wherein: R is the worm pitch radius, L is the length between the worm bearings, H is the distance from the center of the worm gear to the non-movable bearing, $F_{piv}$ is the portion of the separation force that is positioned at the non-movable bearing, and $T_A$ is torque of the worm gear, which can be in either a clockwise or a counterclockwise direction. Simplification of the relationships between these variables can be reduced to the relationship between $F_V$ and $F_s$ of:

$$F_V = F_s(H \pm R\cot\phi)/L \tag{2}$$

Figure 15:
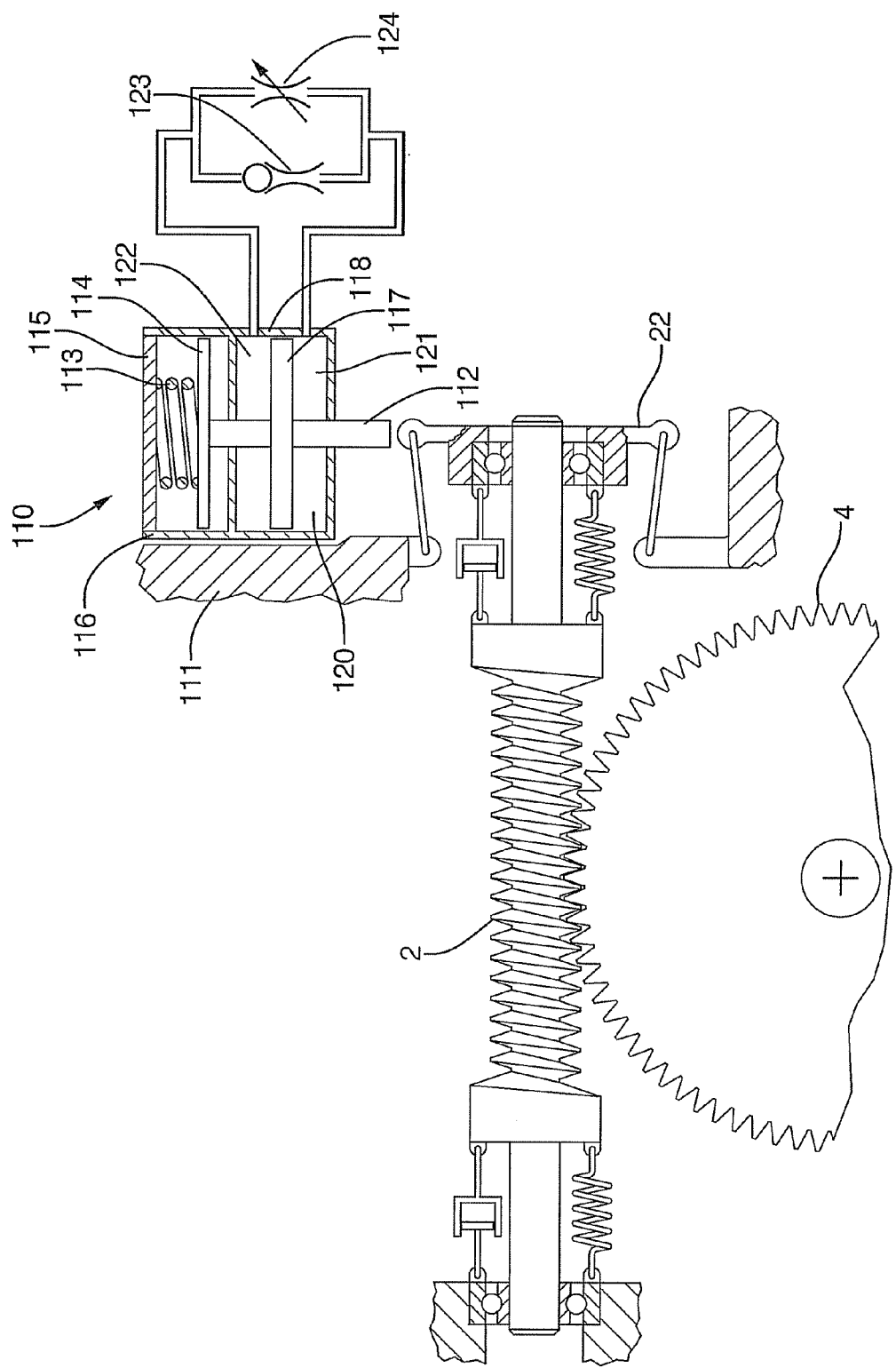
FIG. 15 depicts an alternate schematic of a gear set with a hydraulic damper disclosed herein.
Figure 16:
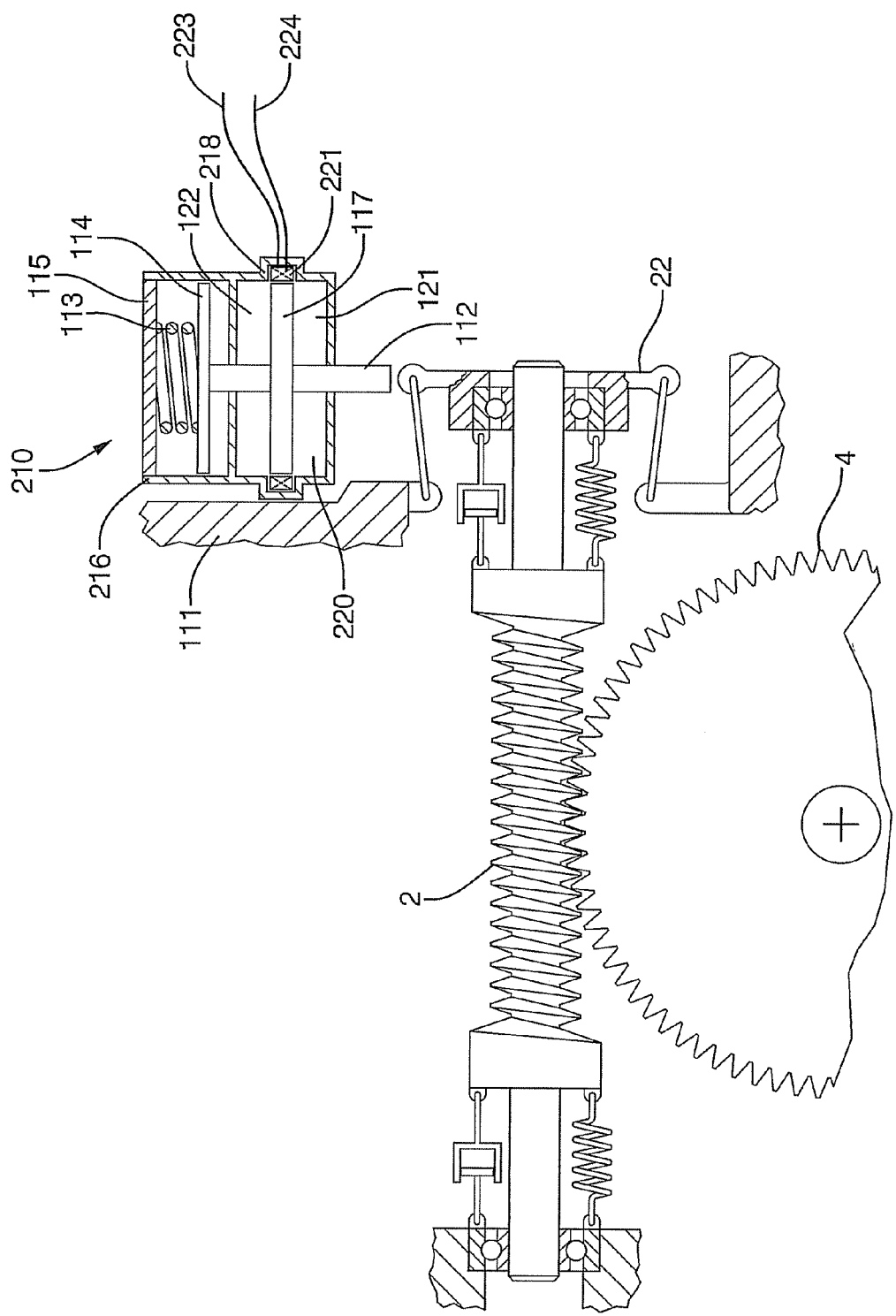
FIG. 16 depicts an alternate schematic of a gear set with a magnetorheological fluidic damper disclosed herein.
Figure 17:
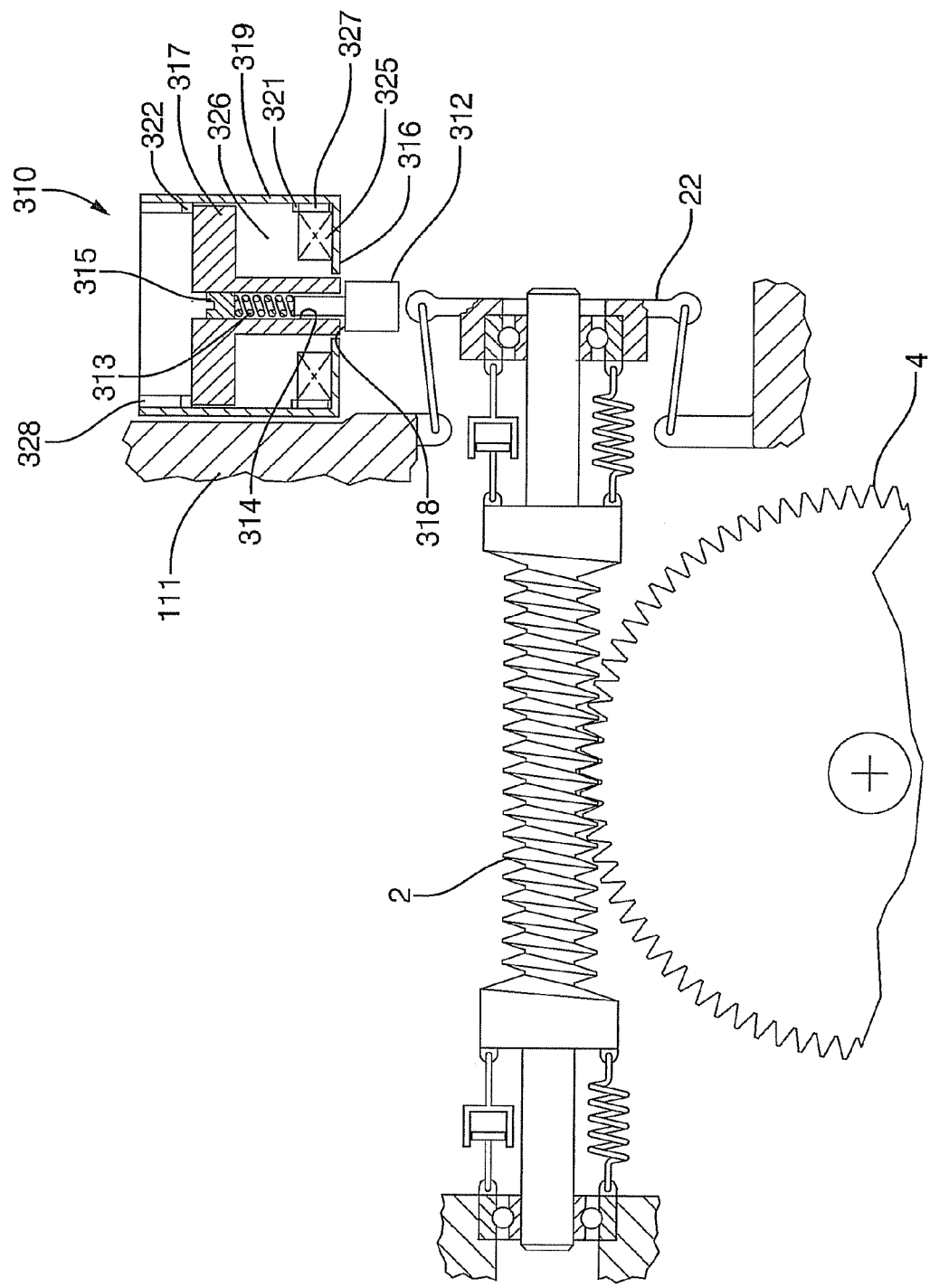
FIG. 17 depicts an alternate schematic of a gear set with a solenoid biasing a movable bearing disclosed herein.

And by substituting for $F_s$ the expression from formula (1), we get:

$$F_V = \left(\frac{T_A}{r_p}\tan\phi\right)(H \pm R\cot\phi)/L: \tag{3}$$

Where the +/− correlates to counterclockwise and clockwise rotational directions of the worm gear respectively. It should be noted that formula (3) holds true for gear systems that utilize four bar linkages such as the gear system 91, as well as for gear systems that use ball bearings, such as the gear system 400, for example, to permit movement of the movable bearing. Additionally, the ball bearing track shown in FIG. 14 is linear and would result in a destabilizing force that will tend to urge the movable bearing away from a central position. Using an arcuate ball bearing track similar to the one shown in FIG. 6, however, can eliminate this destabilizing force. The foregoing relationships allow designers to set biasing and damping parameters to counter potential movement of the movable bearing that could contribute to backlash. Embodiments of the present invention utilizing active members, to prevent or minimize backlash created by gear torque, will be described in reference to FIGS. 15-17. The active members work in either or both of the following ways; one, by increasing the force urging the gears toward one another, and two, by increasing the force required to separate the gears from one another. FIGS. 15-17 are based on the configuration of FIG. 1, namely that the worm gear bearings are fixed relative to the housing and only one of the two bearings of the worm are repositionable relative to the housing. It should be understood, however, that these embodiments may be applied to the embodiments with multiple bearings being repositionable relative to the housing as well.

Referring to FIG. 15, an active member that is a damper assembly, for example a hydraulic damper assembly, in accordance with an embodiment of the present invention is depicted generally at 110. The hydraulic damper assembly 110 is fixedly attached to the housing 111 such that a piston shaft 112 is in contact with the bearing holder 22. The piston shaft 112 is pushed by the bearing holder 22 in response to the bearing holder 22 being pushed by the worm 2 directionally away from the worm gear 4.

A radial bias spring 113 is compressed between piston spring seat 114 and spring stop 115 in response to bearing holder 22 pushing the piston shaft 112. The spring stop 115 is positionably attached to hydraulic housing 116, after assembly of the hydraulic assembly 110 to the housing 111, to create a desired preload force between the piston shaft 112 and the bearing holder 22. The desired force is enough to maintain zero clearance between the teeth of the worm 2 and the worm gear 4 under low torque conditions between the meshing gears.

A piston 117 slidably seals to the interior walls 118 of hydraulic housing 116 creating a first chamber 121 and a second chamber 122 for hydraulic fluid 120 contained therein. As the piston 117 is moved by the spring 115 hydraulic fluid 120, in the first chamber 121, is pumped through one-way valve 123 and variable valve 124 into the second chamber 122. The one-way valve 123 is configured to allow hydraulic fluid 120 to pass from the first chamber 121 to the second chamber 122 but not from the second chamber 122 to the first chamber 121 even if the variable valve 124 is closed. Through this porting the spring is able to push the piston shaft 112 and the bearing holder 22 to maintain no backlash between the meshed gears 2, 4 under conditions of low torque.

One-way valve 123 is configured to prevent the flow of hydraulic fluid 120 there through from the second chamber 122 to the first chamber 121 in response to the bearing holder 22 pushing against the piston shaft 112. Therefore, flow control of hydraulic fluid 120 from the first chamber 121 to the second chamber 122 is provided by the opening and closing of the variable valve 124 resulting in control of the damping stiffness for the movement of the bearing holder 22 relative to the housing 111. Such control can provide a means for preventing movement of the worm 2 away from the worm gear 4 and backlash and noise resulting therefrom.

Referring to FIG. 16, an active member that is a damper assembly, for example a magnetorheological damper assembly, in accordance with an embodiment of the present invention is depicted generally at 210. The magnetorheological damper assembly 210 is fixedly attached to the housing 111 such that a piston shaft 112 is in contact with the bearing holder 22. The piston shaft 112 is pushed by the bearing holder 22 in response to the bearing holder 22 being pushed by the worm 2 directionally away from the worm gear 4.

A radial bias spring 113 is compressed between piston spring seat 114 and spring stop 115 in response to bearing holder 22 pushing the piston shaft 112. The spring stop 115 is positionably attached to magnetorheological housing 216, after assembly of the magnetorheological damper assembly 210 to the housing 111, to create a desired preload force between the piston shaft 112 and the bearing holder 22. The desired force is enough to maintain zero clearance between the teeth of the worm 2 and the worm gear 4 under low torque conditions between the meshing gears.

A piston 117 slidably engages to the interior walls 218 of magnetorheological housing 216 creating a first chamber 121 and a second chamber 122 for magnetorheological fluid 220 contained therein. As the piston 117 is moved by the spring 115, magnetorheological fluid 220 in the first chamber 121 is pumped through the clearance between the piston 117 and the walls 218 into the second chamber 122. Through this fluid transfer the spring 115 is able to push the piston shaft 112 and the bearing holder 22 to maintain no backlash between the meshed gears under conditions of low torque.

Magnetorheological fluid 220 has the capability of changing viscosity when a magnetic field is applied to the fluid 220. The change in viscosity occurs very quickly with changes in the strength of the magnetic field and the viscosity is proportional to the strength of the magnetic field. It is these properties and the manipulation of them that makes magnetorheological dampers an attractive choice for damping devices.

The coil 221 forms an electromagnet that creates a magnetic field of varying strength depending upon the current supplied to the coil 221 via wires 223 and 224. The magnetorheological fluid 220 contained in the clearance between the piston 117 and the walls 218 is positioned within the magnetic field of the coil 221. The clearance between the piston 117 and the walls 218 is sized to allow for varying damping rates of the magnetorheological damper assembly 210 depending upon the viscosity of the magnetorheological fluid 220. Thus, controlling the current supplied to the coil 221 can control the damping of the magnetorheological damper assembly 210. Such control can provide a means for preventing movement of the worm 2 away from the worm gear 4 and backlash and noise resulting therefrom.

Referring to FIG. 17, an active member that is a solenoid assembly, for example a pancake solenoid assembly, in accordance with an embodiment of the present invention is depicted generally at 310. A pancake solenoid assembly 310 may be desirable for its relatively high force generation compared to its size, mass and cost; however, other types of solenoids may also be incorporated. The pancake solenoid assembly 310 is fixedly attached to the housing 111 such that a piston extension shaft 312 is in contact with the bearing holder 22. The piston extension shaft 312 is pushed by the bearing holder 22 in response to the bearing holder 22 being pushed by the worm 2 directionally away from the worm gear 4.

The piston extension shaft 312 is slidably engaged in a piston 317 in piston bore 314. A shoulder 318 on the piston extension shaft 312 contacts the piston 317 limiting the travel of the piston extension shaft 312. A radial bias spring 313 is compressed between the piston extension shaft 312 and a spring stop 315. The spring stop 315 is movably attached to the piston 317 such that movement of the spring stop 315 relative to the piston 317 can adjust the force that the spring 313 applies to the piston extension shaft 312 and that the piston extension shaft 312 applies to the bearing holder 22 before being fixedly attached to the piston 317. Thus an adjustment to the spring force is achievable.

The piston 317 slidably engages to interior walls 319 of pancake solenoid housing 316. A first bumper 321, attached to coil/bumper retainer 327 that is movably attached to interior walls 319, limits the movement of the piston 317 in a direction towards the bearing holder 22. A second bumper 322, attached to coil/bumper retainer 328 that is movably attached to the interior walls 319 limits the movement of the piston 317 in a direction away from the bearing holder 22.

A coil 325, attached to the coil/bumper retainer 327 is located on the bearing holder side of the piston 317. The coil 325 creates a magnetic field in response to electrical current being supplied to the coil 325. The strength of the magnetic field is proportional to the amount of current supplied to the coil 325. The attractive force on the piston 317 by the magnetic field pulls the piston 317 in the direction of the bearing holder 22. A variable force can therefore be applied to the bearing holder 22 from the piston 317 through the piston extension shaft 312 in response to a variable current being supplied to the coil 325.

The pulling force on the piston 317 generated by a specific current in the coil 325 varies depending on the size of an axial air gap 326 between the coil 325 and the piston 317. Therefore, adjustability of the air gap 326 may be desirable. Positioning the pancake solenoid assembly 310 relative to the housing 111 such that contact of the bearing holder 22 to the piston extension shaft 312 pushes the piston 317 until it makes contact with the second bumper 322 sets a preliminary maximum air gap 326. Since the coil 325 and the first bumper 321 are attached to the coil/bumper retainer 327, movement of the coil/bumper retainer 327 relative to the interior walls 319 adjusts the size of the air gap 326. Fixing the coil/bumper retainer 327 to the interior walls 319 when the desired air gap 326 is attained will lock in the air gap 326.

With the above described methods two adjustments can be made independent of one another, specifically: the radial spring force, which creates a preload force to mesh the gears with no backlash at low torque levels, and the air gap size within the solenoid to allow for a predictable force versus applied solenoid current. Control of the solenoid force can provide a means for preventing movement of the worm 2 away from the worm gear 4 and backlash and noise resulting there from. A method for controlling the solenoid is using "current-mode" control. By measuring the solenoid current and feeding it back to either a hardware or a software current controller, the force can be controlled independently of coil resistance or coil temperature.

The three methods of active control described: hydraulic damping, magnetorheological fluidic damping and force control through an electronic solenoid, all provide two important features. First, they allow a means of control to increase the force required to separate two meshed gears, and second, they allow a means of control to reduce the force required to separate two meshed gears.

The ability to reduce the gear separation force is desirable to prevent high frictional losses that may result from too high a meshing force. Without the ability to reduce the force needed to separate the meshed gears, any flexing and movement of the gears, bearings, housings, etc. could result in ever increasing meshing loads.

A control system for when to, and how much to control an active member to increase the force required to prevent separation of the meshed gears and when to decrease it can use different parameters as input. For example the vibration of the gear set system can be monitored and used such that for high vibrational loads the separation prevention force can be increased and for low vibrational loads the separation prevention force can be reduced.

Figure 18:
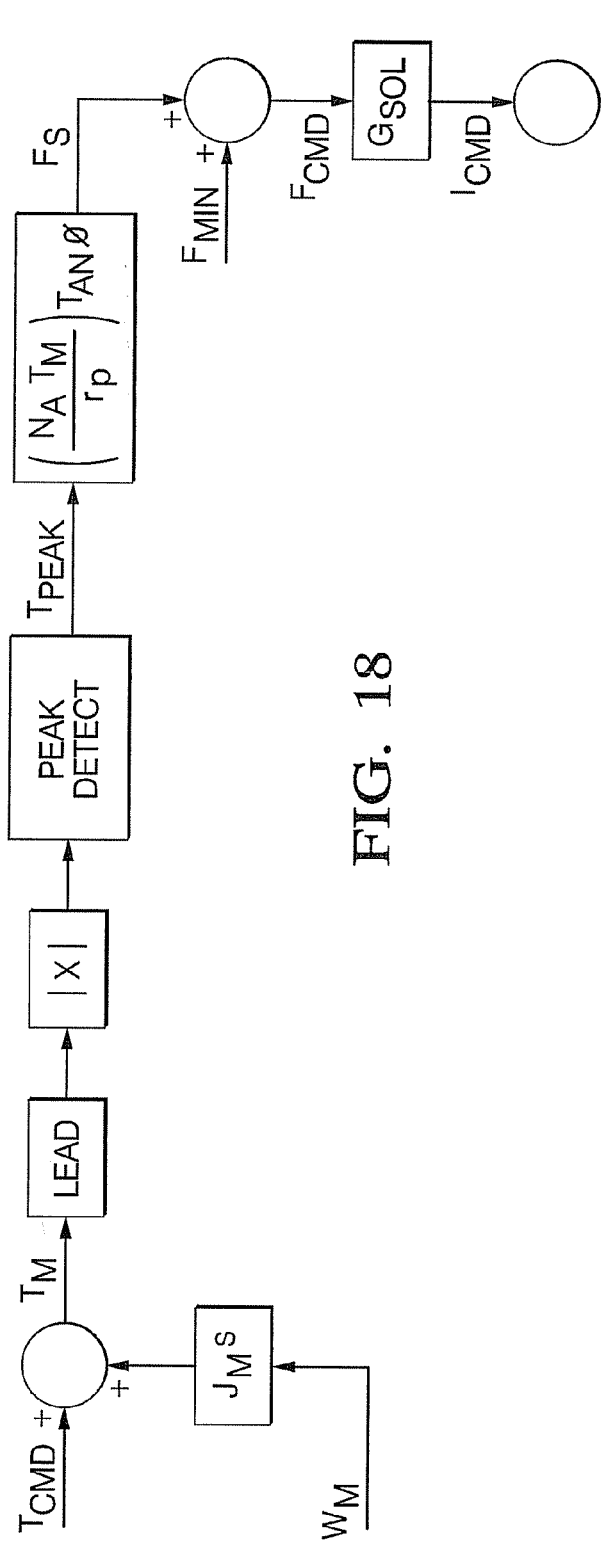
FIG. 18 depicts a block diagram of a control system for force input to an active member disclosed herein.

In an embodiment using an electric motor (not shown) to drive the worm 2, the torque to rotate the electric motor can be determined by the current required to drive the motor. Referring now to FIG. 18, an embodiment of a control system utilizing motor torque as an input parameter is depicted in a block diagram. In this embodiment an algorithm for determining a command force, $F_{cmd}$, to apply to the solenoid 310, for example, is based on an estimate of the motor torque, $T_m$, for a motor driving the worm 2. It should be noted that this algorithm could also be used to control other active members as well, such as a magnetorheological fluid damper or a hydraulic fluid damper, for example. In general, there are two components to the motor torque, $T_m$. The first component is the electromagnetic torque, $T_e$. A motor command torque, $T_{cmd}$, used to drive the worm 2 may be used as an estimate of the electromagnetic torque, $T_m$. This command torque, $T_{cmd}$, actually leads the electromagnetic torque by the motor's electrical time constant. The second component of the motor torque, $T_m$, is the acceleration torque. In order to estimate the acceleration torque, the motor velocity, $\omega_m$, is measured with a tachometer, differentiated, $$\frac{d\omega_m}{dt},$$

and then multiplied by the motor's moment of inertia, $J_m$. Thus:

$$T_m = T_e + J_m \frac{d\omega_m}{dt}, \quad \text{where;} \quad T_e = T_{cmd} \tag{4}$$

This estimate lags the actual acceleration torque by the tachometer time constant and the differentiator lag.

Due to the lags in the system, it is desirable to introduce a lead element into the solenoid control to compensate. It is possible to introduce the lead after the two motor torque component estimates are added as shown in FIG. 18. It is also possible to add lead elements after either or both of the two motor torque component estimates. It is further possible to add a lead element just prior to the solenoid force or current control loop. Choice of lead element location should depend on the specific system configuration and an analysis of the best place to locate the lead based on the lags in the system.

Because the separating force, $F_s$, is unidirectional and its direction does not depend on the direction of the motor torque, $T_m$, the motor torque, $T_m$, estimate needs to be processed through an absolute value function prior to use in solenoid force control.

Another method of dealing with transients and lags in the system is to use a peak-hold algorithm after the absolute value function. One embodiment of such an algorithm is a nonlinear low pass filter with different time constants for rising and falling signals. Next, by expressing torque of a gear, $T_A$ as a function of torque of a worm, $T_m$, for example, $$T_A = N_A T_m \tag{5}$$

Wherein, $N_A$ is an assist ratio of the gear system. Then, by replacing $T_A$ with equation (5) in equation (1), yields:

$$F_s = \left(\frac{N_A T_m}{r_p}\right) \text{Tan}\phi. \tag{6}$$

Thus, expressing the separation force, $F_s$, as a function of motor torque, $T_m$. This expression is a simplified version wherein the control force is set as the separation force. For nonsymmetrically loaded systems and systems wherein only one of the two bearings is movable, such as those described in reference to equation (3) above, the separation force, $F_s$, can be replaced with the expression for $F_r$ from equation (3), for example.

Finally, in order to maintain a minimum force, it is desirable to add a small offset to the force command, $F_{cmd}$, prior to the force or current control loop. As an alternative, the force command, $F_{cmd}$, could be limited to a minimum value, $F_{min}$, thus:

$$F_{cmd} = F_s + F_{min} \tag{7}$$

The force command, $F_{cmd}$, may then be converted to a current command, $I_{cmd}$, by a gain factor, $G_{sol}$, of the solenoid, which may be nonlinear.

Figure 19:
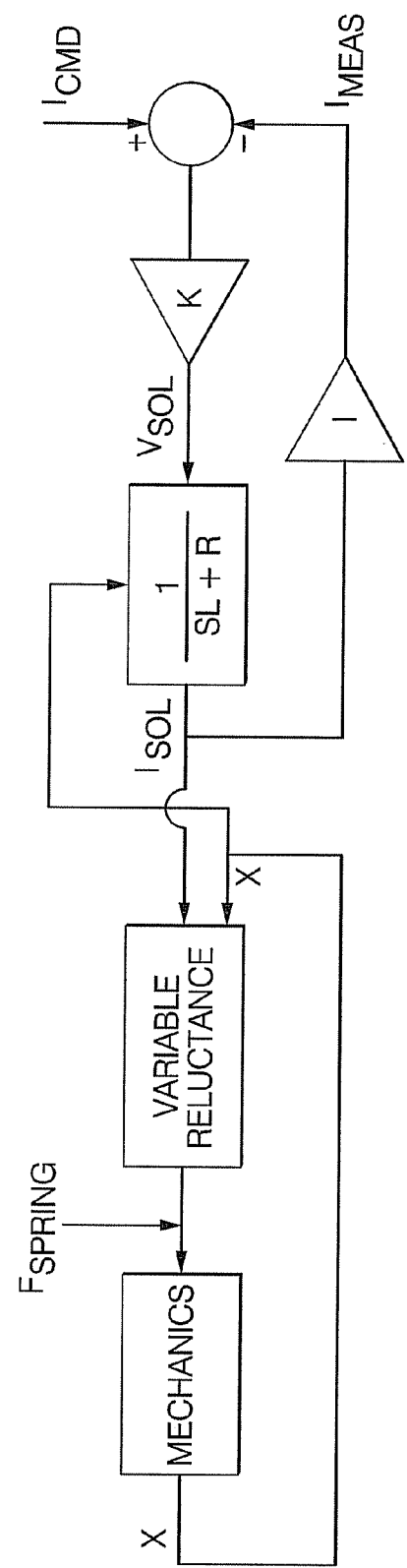
FIG. 19 depicts a block diagram of a control system for current control to a solenoid disclosed herein.

Referring now to FIG. 19, an embodiment of a control system, for the solenoid current, is depicted by a block diagram. The command current, $I_{cmd}$, is used to drive the solenoid, with feedback supplied by a measured current, $I_{meas}$, found from the solenoid voltage, $V_{sol}$, which is monitored and converted to current, $I_{meas}$, by:

$$I_{meas} = \frac{V_{sol}}{sL + R} \tag{8}$$

Where: s is a Laplace operator, L is the inductance, and R is the resistance. The command current, $I_{cmd}$, can be further fine tuned by taking into consideration the variable reluctance from the positional offset, x, and the mechanical variations, of the solenoid.

Embodiments of the invention may have some of the following advantages: meshed gears maintain in contact at all times eliminating backlash, clearances due to build variation and component wear are automatically adjusted for, friction of the gears is minimized since the meshing preload is kept at a low level, and audible noise due to gear rattle is minimized.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A gear set apparatus comprising:
   a housing;
   a first gear in said housing between a first bearing and a second bearing, at least one of said first bearing and said second bearing fixedly attached to said housing, said first gear moveable in said housing such that a first axis defined by the first gear is repositionable relative to the housing;

a second gear in mesh with the first gear;
a second axis defined by the second gear, and movement of the first axis is constrained to a plane containing both the first axis and a line commonly perpendicular to the first axis and the second axis; and
a biasing member that urges the first gear toward the second gear.

2. The gear set apparatus of claim 1, wherein an active member resists the movement of the first gear away from the second gear.

3. The gear set apparatus of claim 1, wherein the urging force maintains continuous contact of teeth of the first gear with teeth of the second gear.

4. The gear set apparatus of claim 1, further comprising:
at least two ball bearings constrained to travel in at least one pair of complementary grooves that control the motion of the first gear relative to the housing.

5. The gear set apparatus of claim 4, wherein the plurality of grooves have an arcuate shape.

6. The gear set apparatus of claim 1, wherein the first gear is a worm and the second gear is a worm gear.

7. The gear set apparatus of claim 1, wherein a first end of the first axis is repositionable relative to the housing and a second end of the first axis is repositionable relative to the housing.

8. A gear set apparatus comprising:
a housing;
a first gear in said housing between a first bearing and a second bearing, at least one of said first bearing and said second bearing fixedly attached to said housing, said first gear moveable in said housing such that a first axis defined by the first gear is repositionable relative to the housing;
a second gear in mesh with the first gear;
a second axis defined by the second gear, and movement of the first axis is constrained to a plane containing both the first axis and a line commonly perpendicular to the first axis and the second axis;
a biasing member that urges the first gear toward the second gear; and
an active member that resists the movement of the first gear away from the second gear, and adjusts the resistance to the movement of the first gear in response to gear torque or gear vibration.

9. A gear set apparatus comprising:
a housing;
a first gear in said housing between a first bearing and a second bearing, at least one of said first bearing and said second bearing fixedly attached to said housing, said first gear moveable in said housing such that a first axis defined by the first gear is repositionable relative to the housing;
a second gear in mesh with the first gear;
a second axis defined by the second gear, and movement of the first axis is constrained to a plane containing both the first axis and a line commonly perpendicular to the first axis and the second axis;
a biasing member that urges the first gear toward the second gear; and
an active member that resists the movement of the first gear away from the second gear, the active member is a hydraulic damper, a magnetorheological fluid damper, or a solenoid.

10. A gear set apparatus comprising:
a housing;
a first gear in said housing between a first bearing and a second bearing, at least one of said first bearing and said second bearing fixedly attached to said housing, said first gear moveable in said housing such that a first axis defined by the first gear is repositionable relative to the housing;
a second gear in mesh with the first gear;
a second axis defined by the second gear, and movement of the first axis is constrained to a plane containing both the first axis and a line commonly perpendicular to the first axis and the second axis; and
a biasing member that urges the first gear toward the second gear, wherein the biasing member is a four-bar-linkage.

11. A gear set apparatus comprising:
a housing;
a first gear in said housing between a first bearing and a second bearing, at least one of said first bearing and said second bearing fixedly attached to said housing, said first gear moveable in said housing such that a first axis defined by the first gear is repositionable relative to the housing;
a second gear in mesh with the first gear;
a second axis defined by the second gear, and movement of the first axis is constrained to a plane containing both the first axis and a line commonly perpendicular to the first axis and the second axis;
a biasing member that urges the first gear toward the second gear; and
at least one four-bar-linkage that controls the movement of the first gear relative to the housing.

12. A gear set apparatus comprising:
a housing;
a first gear in said housing between a first bearing and a second bearing, at least one of said first bearing and said second bearing fixedly attached to said housing, said first gear moveable in said housing such that a first axis defined by the first gear is repositionable relative to the housing;
a second gear in mesh with the first gear;
a second axis defined by the second gear, and movement of the first axis is constrained to a plane containing both the first axis and a line commonly perpendicular to the first axis and the second axis;
a biasing member that urges the first gear toward the second gear;
at least two ball bearings constrained to travel in at least one pair of complementary grooves that control the motion of the first gear relative to the housing, the at least one pair of complementary grooves having an arcuate shape;
at least one ball carrier that maintains spacing between the at least two ball bearings; and
at least one carrier control link that maintains position of the at least one ball carrier relative to the housing and the first gear.

13. A gear set apparatus comprising:
a first gear having teeth and a first shaft;
a second gear having teeth and a second shaft, and the teeth of the second gear mesh with the teeth of the first gear;

a housing, wherein the second shaft is rotationally attached to the housing and the first shaft is rotationally and movably attached to the housing through a structure, including a first bearing and a second bearing, at least one of said first bearing and said second bearing fixedly attached to said housing, such that the movement of the first shaft is constrained to a plane containing both the first shaft and a line commonly perpendicular to the first shaft and the second shaft; and a biasing member that urges movement of the first shaft toward the second shaft thereby maintaining continuous contact of the teeth of the first gear with the teeth of the second gear.

* * * * *